US009111286B2

(12) United States Patent
Lewis et al.

(10) Patent No.: US 9,111,286 B2
(45) Date of Patent: Aug. 18, 2015

(54) MULTIPLE ACTIONS AND ICONS FOR MOBILE ADVERTISING

(75) Inventors: Robert C. Lewis, San Diego, CA (US); Giridhar D. Mandyam, San Diego, CA (US); Martin C. Dickens, Peterborough (GB)

(73) Assignee: QUALCOMM, Incorporated, San Diego, CA (US)

( * ) Notice: Subject to any disclaimer, the term of this patent is extended or adjusted under 35 U.S.C. 154(b) by 483 days.

(21) Appl. No.: 12/361,399

(22) Filed: Jan. 28, 2009

(65) Prior Publication Data

US 2009/0199114 A1 Aug. 6, 2009

Related U.S. Application Data

(60) Provisional application No. 61/025,624, filed on Feb. 1, 2008.

(51) Int. Cl.
*G06F 3/048* (2006.01)
*G06F 3/00* (2006.01)
*G06Q 30/00* (2012.01)
*G06Q 30/02* (2012.01)
(Continued)

(52) U.S. Cl.
CPC ............... *G06Q 30/02* (2013.01); *H04W 4/206* (2013.01); *H04M 3/4878* (2013.01); *H04M 2203/253* (2013.01); *H04M 2207/18* (2013.01)

(58) Field of Classification Search
CPC ............ G06Q 30/0241; G06Q 30/002; G06Q 30/0641
USPC ............... 715/740–749, 762–765; 705/14.67, 705/14.69
See application file for complete search history.

(56) References Cited

U.S. PATENT DOCUMENTS 6,157,814 A * 12/2000 Hymel et al. ................ 340/7.56
6,317,718 B1 11/2001 Fano
(Continued)

FOREIGN PATENT DOCUMENTS

CN 1441376 A 9/2003
CN 1720547 A 1/2006
(Continued)

OTHER PUBLICATIONS

International Search Report and Written Opinion—PCT/US2009/032385, International Search Authority—European Patent Office—Jun. 30, 2009.

(Continued)

*Primary Examiner* — Tadeese Hailu
(74) *Attorney, Agent, or Firm* — Shirin Tefagh

(57) ABSTRACT

On a mobile communication device there are many more possible workflows that could be followed given the available functions of that device. These may include, but are not limited to, "click to call", "click to locate", "click to SMS", "click to send a picture", "click to handle later", and can be constrained only by the available and accessible functionality of the user's device. A list of actions to be made available associated with an advertisement are provided along with an iconic visual representation of those actions for the user to identify what the resultant workflow will be if they activate the action. The list can be presented as selectable actions within the advertisement, on a sub menu activated by a dedicated device key or assigned softkey, or directly activated by using dedicated device keys or assigned soft keys, or other user-to-device interaction methods.

78 Claims, 17 Drawing Sheets

(51) Int. Cl.
*H04W 4/20* (2009.01)
*H04M 3/487* (2006.01)

(56) References Cited

U.S. PATENT DOCUMENTS

| | | | |
|---|---|---|---|
| 6,484,148 B1 | 11/2002 | Boyd | |
| 6,496,837 B1* | 12/2002 | Howard et al. | 1/1 |
| 6,539,429 B2* | 3/2003 | Rakavy et al. | 709/224 |
| 6,647,269 B2 | 11/2003 | Hendrey et al. | |
| 6,848,995 B1 | 2/2005 | Walker et al. | |
| 6,920,319 B2 | 7/2005 | Knutsson et al. | |
| 6,928,615 B1* | 8/2005 | Haitsuka et al. | 715/738 |
| 7,003,734 B1* | 2/2006 | Gardner et al. | 715/808 |
| 7,428,497 B2 | 9/2008 | Agarwal et al. | |
| 2001/0004733 A1 | 6/2001 | Eldering | |
| 2002/0072353 A1* | 6/2002 | Kim | 455/414 |
| 2002/0102993 A1* | 8/2002 | Hendrey et al. | 455/456 |
| 2002/0116258 A1 | 8/2002 | Stamatelatos et al. | |
| 2002/0194061 A1 | 12/2002 | Himmel et al. | |
| 2002/0198851 A1* | 12/2002 | Hashimoto et al. | 705/400 |
| 2003/0003929 A1 | 1/2003 | Himmel et al. | |
| 2003/0093311 A1* | 5/2003 | Knowlson | 705/10 |
| 2003/0093792 A1 | 5/2003 | Labeeb et al. | |
| 2003/0096625 A1 | 5/2003 | Lee et al. | |
| 2003/0101454 A1 | 5/2003 | Ozer et al. | |
| 2003/0110171 A1 | 6/2003 | Ozer et al. | |
| 2003/0114157 A1 | 6/2003 | Spitz et al. | |
| 2003/0186722 A1 | 10/2003 | Weiner | |
| 2004/0172661 A1 | 9/2004 | Yagawa et al. | |
| 2004/0186778 A1* | 9/2004 | Margiloff et al. | 705/14 |
| 2004/0249709 A1 | 12/2004 | Donovan et al. | |
| 2005/0080665 A1 | 4/2005 | Bowman-Amuah | |
| 2005/0096975 A1 | 5/2005 | Moshe | |
| 2005/0165644 A1 | 7/2005 | Beyda et al. | |
| 2005/0239495 A1* | 10/2005 | Bayne | 455/550.1 |
| 2005/0267816 A1 | 12/2005 | Jaramillo | |
| 2006/0064346 A1 | 3/2006 | Steenstra et al. | |
| 2006/0149624 A1* | 7/2006 | Baluja et al. | 705/14 |
| 2006/0218179 A1 | 9/2006 | Gardner et al. | |
| 2006/0235938 A1 | 10/2006 | Pennell et al. | |
| 2006/0242267 A1 | 10/2006 | Grossman | |
| 2006/0271415 A1 | 11/2006 | Simmons et al. | |
| 2007/0011020 A1 | 1/2007 | Martin | |
| 2007/0073585 A1 | 3/2007 | Apple et al. | |
| 2007/0088801 A1 | 4/2007 | Levkovitz et al. | |
| 2007/0097915 A1 | 5/2007 | Papasakellariou | |
| 2007/0121845 A1 | 5/2007 | Altberg et al. | |
| 2007/0156532 A1* | 7/2007 | Nyhan et al. | 705/14 |
| 2007/0174490 A1* | 7/2007 | Choi et al. | 709/246 |
| 2007/0175998 A1* | 8/2007 | Lev | 235/454 |
| 2007/0208828 A1 | 9/2007 | Brier et al. | |
| 2007/0256095 A1* | 11/2007 | Collins | 725/34 |
| 2007/0276729 A1 | 11/2007 | Freer | |
| 2007/0288976 A1 | 12/2007 | Redling et al. | |
| 2008/0004954 A1 | 1/2008 | Horvitz | |
| 2008/0010133 A1 | 1/2008 | Pyhalammi et al. | |
| 2008/0026768 A1 | 1/2008 | Fok et al. | |
| 2008/0059300 A1* | 3/2008 | Hamoui | 705/14 |
| 2008/0103850 A1 | 5/2008 | Shen | |
| 2008/0147493 A1* | 6/2008 | Aarnio et al. | 705/14 |
| 2008/0167992 A1 | 7/2008 | Kokernak et al. | |
| 2008/0240010 A1* | 10/2008 | Vasudevan et al. | 370/312 |
| 2008/0249834 A1 | 10/2008 | Zigmond et al. | |
| 2009/0011740 A1 | 1/2009 | Aggarwal et al. | |
| 2009/0011744 A1 | 1/2009 | Daley et al. | |
| 2009/0012861 A1 | 1/2009 | Krishnaswamy et al. | |
| 2009/0013024 A1 | 1/2009 | Aggarwal et al. | |
| 2009/0013051 A1 | 1/2009 | Renschler et al. | |
| 2009/0048977 A1 | 2/2009 | Aggarwal et al. | |
| 2009/0132377 A1* | 5/2009 | Thompson et al. | 705/14 |
| 2009/0144207 A1* | 6/2009 | Dominowska et al. | 705/400 |
| 2009/0187463 A1* | 7/2009 | Dacosta | 705/10 |
| 2009/0197582 A1 | 8/2009 | Lewis et al. | |
| 2009/0197616 A1 | 8/2009 | Lewis et al. | |
| 2009/0198579 A1 | 8/2009 | Lewis et al. | |
| 2009/0199107 A1 | 8/2009 | Lewis et al. | |
| 2009/0319329 A1 | 12/2009 | Aggarwal et al. | |
| 2009/0319385 A1 | 12/2009 | Jackson et al. | |
| 2010/0223111 A1 | 9/2010 | Maekawa | |

FOREIGN PATENT DOCUMENTS

| | | |
|---|---|---|
| CN | 101073053 A | 11/2007 |
| JP | 2002123661 A | 4/2002 |
| JP | 2002140611 A | 5/2002 |
| JP | 2002312673 A | 10/2002 |
| JP | 2002342657 A | 11/2002 |
| JP | 2002354446 A | 12/2002 |
| JP | 2003006509 A | 1/2003 |
| JP | 2003018085 A | 1/2003 |
| JP | 2003091679 A | 3/2003 |
| JP | 2003167900 A | 6/2003 |
| JP | 2003522354 | 7/2003 |
| JP | 2003256713 A | 9/2003 |
| JP | 2003337890 A | 11/2003 |
| JP | 2003346052 A | 12/2003 |
| JP | 2004515833 A | 5/2004 |
| JP | 2004157498 A | 6/2004 |
| JP | 2005073147 A | 3/2005 |
| JP | 2005107728 A | 4/2005 |
| JP | 2005216035 A | 8/2005 |
| JP | 2006325215 A | 11/2006 |
| JP | 2007004489 A | 1/2007 |
| JP | 2007094560 A | 4/2007 |
| JP | 2007183766 A | 7/2007 |
| JP | 2007280363 A | 10/2007 |
| JP | 2009543191 A | 12/2009 |
| JP | 2009545259 A | 12/2009 |
| KR | 20020033488 A | 5/2002 |
| KR | 20030042946 A | 6/2003 |
| KR | 20050089001 A | 9/2005 |
| KR | 20060030020 A | 4/2006 |
| KR | 20060088845 A | 8/2006 |
| KR | 20070005873 A | 1/2007 |
| KR | 20070051982 A | 5/2007 |
| KR | 20070101237 A | 10/2007 |
| RU | 2007107484 A | 9/2008 |
| WO | 01/43010 A1 | 6/2001 |
| WO | 01/43018 A1 | 6/2001 |
| WO | 2004/042525 A2 | 5/2004 |
| WO | 2004/100022 A1 | 11/2004 |
| WO | 2006/037054 A1 | 4/2006 |
| WO | 2006/065503 A2 | 6/2006 |
| WO | 2007/030093 | 3/2007 |
| WO | 2007/148512 A1 | 12/2007 |
| WO | 2008/005099 A1 | 1/2008 |
| WO | 2008/130269 A2 | 10/2008 |

OTHER PUBLICATIONS

EPO: "Notice From the European Patent Office Dated Oct. 1, 2007 Concerning Business Methods", Journal of the European Patent Office—vol. 30, No. 11, Nov. 1, 2007, pp. 592-593, XP007905525, ISSN: 0170-9291.
Supplementary European Search Report—EP09707421—Search Authority—The Hague—Dec. 21, 2012.
Roumeliotis, T., "Five geofencing ideas for mobile marketing from brands and retailers," Mobile Commerce Daily, Jul. 16, 2010, 2 pages, Retrieved from http://www.mobilecommercedaily.com/five-geofencing-ideas-for-mobile-marketing-from-brandsand-retailers.

* cited by examiner

MULTIPLE ACTIONS AND ICONS FOR MOBILE ADVERTISING

CLAIM OF PRIORITY UNDER 35 U.S.C. §119

This Application for Patent claims the benefit of U.S. Provisional Application Ser. No. 61/025,624 filed on 1 Feb. 2008 entitled "ICONS FOR MOBILE ADVERTISING," the disclosure of which is hereby incorporated by reference in their entirety.

BACKGROUND

Aspects disclosed herein pertain to a communication network that distributes and tracks advertisements presented on a mobile communication device, and in particular, to providing a marketplace platform that serves as a bridge between advertising platforms and a population of mobile communication devices for targeting and tracking particular advertisements suitably formatted and timed for a user of a mobile communication device.

For many years, companies have tried to brand their products, satisfy existing consumers, and reach potential new consumers through traditional means. The evolution has been linear when less creative, and sometimes non-linear, when more creative, as advertising has gone from print forms like newspapers, magazines, brochures, newsletters, press releases and billboards, to event-related activities, like sponsorships, seminars, point-of-sale and promotional programs, to broadcast media, like radio, television, cable and recently satellite cable.

In recent years, there has been a rise of advertising that is more targeted and tailored to individual consumers, with new forms of previously so-called direct advertising. New endeavors have sought to interact directly with consumers through pull campaigns and push campaigns, and make advertising more measurable to bring advertisers specific consumer data mining bearing on consumer buying habits, trending and predicting future habits. Advances in technology outlets combined with marketing ingenuity have expanded the old direct mail marketing campaigns into new branches, including telemarketing, point-of-sale campaigns, computer platforms, and most recently distribution and measurement through telecommunications networks.

With respect to the latter, perhaps the greatest platform for the new world of marketing has been the same as the greatest platform for information exchange in the last decade, namely the Internet. Through such avenues as branded websites, banner ads, pop-up ads, targeted e-mails, portal sponsorships, to name a few examples, advertisers have been able to hone in on target audiences. Through defined metrics and innovative semantics, like served impressions, click-through rate (CTR), cost per action (CPA), cost per click (CPC), cost per sale (CPS), and cost per thousand (CPM), to name a few, advertisers have been able to measure the results of targeted ads and objectively set fees for performance results obtained. Along with these new advances, and because of the increasingly cosmopolitan nature of business, geopolitics, and integrated telecommunications networks, so too has advertising become increasingly global in nature.

Along with advances in personal computing that enabled expansion of Internet advertising (e.g., desktop and notebook computers and broadband Internet access), advances in technology have also resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. With advances in computing technology, consumers are increasingly offered many types of electronic devices ("user equipment") that can be provisioned with an array of software applications. Distinct features such as email, Internet browsing, game playing, address book, calendar, media players, electronic book viewing, voice communication, directory services, etc., increasingly are selectable applications that can be loaded on a multi-function device such as a smart phone, portable game console, or hand-held computer.

Even with these advances, mobile communication devices tend to have communication bandwidth, processing, and user interface constraints over general purpose computing devices. For example, the screen size, amount of available memory and file system space, amount of input and output capabilities and processing capability may each be limited by the small size of the device. Because of such severe resource constraints, it is desirable, for example, to maintain a limited size and quantity of software applications and other information residing on such remote personal computing devices, e.g., client devices. As such, the computing platforms for such devices are often optimized for a particular telephone chipset and user interface hardware.

Limited attempts to extend advertising to mobile communication devices have generally followed the paradigm of Internet browsing. Given the differences in how a user chooses to use a mobile communication device and given its limitations, such mobile web advertising has been of marginal quantity and value to advertisers.

SUMMARY

The following presents a simplified summary in order to provide a basic understanding of some aspects of the disclosed versions. This summary is not an extensive overview and is intended to neither identify key or critical elements nor delineate the scope of such versions. Its purpose is to present some concepts of the described versions in a simplified form as a prelude to the more detailed description that is presented later.

In one aspect, a method is provided for distributing advertisement content to a mobile communication device. A plurality of advertisement actions are defined, each action associated with a communication function of a mobile communication device and each action associated respectively with one of a plurality of icons. An advertisement action is selected from the plurality of advertisement actions based upon availability of the associated communication function for the mobile communication device and accessibility of an advertiser target by the associated communication function. The advertisement icon is sent with an advertisement to the mobile communication device for presentation.

In another aspect, at least one processor distributes advertisement content to a mobile communication device. A module defines a plurality of advertisement actions, each action associated with a communication function of a mobile communication device and each action associated respectively with one of a plurality of icons. A module selects an advertisement action from the plurality of advertisement actions based upon availability of the associated communication function for the mobile communication device and accessibility of an advertiser target by the associated communication function. A module sends an advertisement associated with the advertisement icon to the mobile communication device for presentation.

In an additional aspect, a computer program product distributes advertisement content to a mobile communication device. A computer-readable medium comprises at least one instruction for causing a computer to identify a plurality of advertisement actions, each action associated with a communication function of a mobile communication device and each action associated respectively with one of a plurality of icons. At least one instruction for causing the computer to select an advertisement action from the plurality of advertisement actions based upon availability of the associated communication function for the mobile communication device and accessibility of an advertiser target by the associated communication function. At least one instruction for causing the computer to send an advertisement associated with the advertisement icon to the mobile communication device for presentation.

In another additional aspect, an apparatus distributes advertisement content to a mobile communication device. Means are provided for identifying a plurality of advertisement actions, each action associated with a communication function of a mobile communication device and each action associated respectively with one of a plurality of icons. Means are provided for selecting an advertisement action from the plurality of advertisement actions based upon availability of the associated communication function for the mobile communication device and accessibility of an advertiser target by the associated communication function. Means are provided for sending an advertisement associated with the advertisement icon to the mobile communication device for presentation.

In a further aspect, an apparatus distributes advertisement content to a mobile communication device. An editing computing platform comprises a graphical user interface for identifying a plurality of advertisement actions, each action associated with a communication function of a mobile communication device and each action associated respectively with one of a plurality of icons, and for selecting an advertisement action from the plurality of advertisement actions based upon availability of the associated communication function for the mobile communication device and accessibility of an advertiser target by the associated communication function. A communication module sends an advertisement associated with the advertisement icon to the mobile communication device for presentation.

In yet one aspect, a method is provided for a mobile communication device to implement advertisement content. A plurality of advertisement actions are received, each action associated with a communication function of a mobile communication device and each action associated respectively with one of a plurality of icons. A selection for an advertisement action is received from the plurality of advertisement actions based upon availability of the associated communication function for the mobile communication device and accessibility of an advertiser target by the associated communication function. An advertisement associated with the advertisement icon is received at the mobile communication device for presentation. The selected advertisement action is implemented in response to an input by a user via a user interface of the mobile communication device interacting with the advertisement.

In yet another aspect, at least one processor for a mobile communication device implements advertisement content. A module receives a plurality of advertisement actions, each action associated with a communication function of a mobile communication device and each action associated respectively with one of a plurality of icons. A module receives a selection for an advertisement action from the plurality of advertisement actions based upon availability of the associated communication function for the mobile communication device and accessibility of an advertiser target by the associated communication function. A module receives an advertisement associated with the advertisement icon at the mobile communication device for presentation. A module implements the selected advertisement action in response to an input by a user via a user interface of the mobile communication device interacting with the advertisement.

In yet an additional aspect, a computer program product for a mobile communication device implements advertisement content by having a computer-readable medium that comprises at least one instruction for causing a computer to incorporate a plurality of advertisement actions, each action associated with a communication function of a mobile communication device and each action associated respectively with one of a plurality of icons. At least one instruction for causing the computer to receive a selection for an advertisement action from the plurality of advertisement actions based upon availability of the associated communication function for the mobile communication device and accessibility of an advertiser target by the associated communication function. At least one instruction for causing the computer to receive an advertisement associated with the advertisement icon at the mobile communication device for presentation. At least one instruction for causing the computer to implement the selected advertisement action in response to an input by a user via a user interface of the mobile communication device interacting with the advertisement.

In yet another additional, an apparatus for a mobile communication device implements advertisement content. Means are provided for incorporating a plurality of advertisement actions, each action associated with a communication function of a mobile communication device and each action associated respectively with one of a plurality of icons. Means are provided for receiving a selection for an advertisement action from the plurality of advertisement actions based upon availability of the associated communication function for the mobile communication device and accessibility of an advertiser target by the associated communication function. Means are provided for receiving an advertisement associated with the advertisement icon at the mobile communication device for presentation. Means are provided for implementing the selected advertisement action in response to an input by a user via a user interface of the mobile communication device interacting with the advertisement.

In yet a further aspect, an apparatus for a mobile communication device implements advertisement content. Local storage receives a plurality of advertisement actions, each action associated with a communication function of a mobile communication device and each action associated respectively with one of a plurality of icons, and for receiving a selection for an advertisement action from the plurality of advertisement actions based upon availability of the associated communication function for the mobile communication device and accessibility of an advertiser target by the associated communication function. A communication module receiving an advertisement associated with the advertisement icon at the mobile communication device for presentation. A user interface receives an input by a user interacting with the advertisement. A processor implements the selected advertisement action in response to the user input.

To the accomplishment of the foregoing and related ends, one or more versions comprise the features hereinafter fully described and particularly pointed out in the claims. The following description and the annexed drawings set forth in detail certain illustrative aspects and are indicative of but a few of the various ways in which the principles of the versions may be employed. Other advantages and novel features will become apparent from the following detailed description when considered in conjunction with the drawings and the disclosed versions are intended to include all such aspects and their equivalents.

DETAILED DESCRIPTION

On the Internet, the resultant single workflow from activating an advertisement, can be viewed within a host web page in a web browser, is to launch a landing page within same or a new instance of the web browser. On a mobile communication device there are many more possible workflows that could be followed given the available functions of that device. These may include, but are not limited to, "click to call", "click to locate", "click to SMS", "click to send a picture", "click to handle later", and are constrained only by the available and accessible functionality of the user's device. A list of actions to be made available associated with an advertisement are provided along with an iconic visual representation of those actions for the user to identify what the resultant workflow will be if they activate the action. The list can be presented as selectable actions within the advertisement, on a sub menu activated by a dedicated device key or assigned softkey, or directly activated by using dedicated device keys or assigned soft keys, or other user-to-device interaction methods.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to concisely describe these versions.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The apparatus and methods are especially well suited for use in wireless environments, but may be suited in any type of network environment, including but not limited to, communication networks, public networks, such as the Internet, private networks, such as virtual private networks (VPN), local area networks, wide area networks, long haul networks, or any other type of data communication network.

Figure 1:
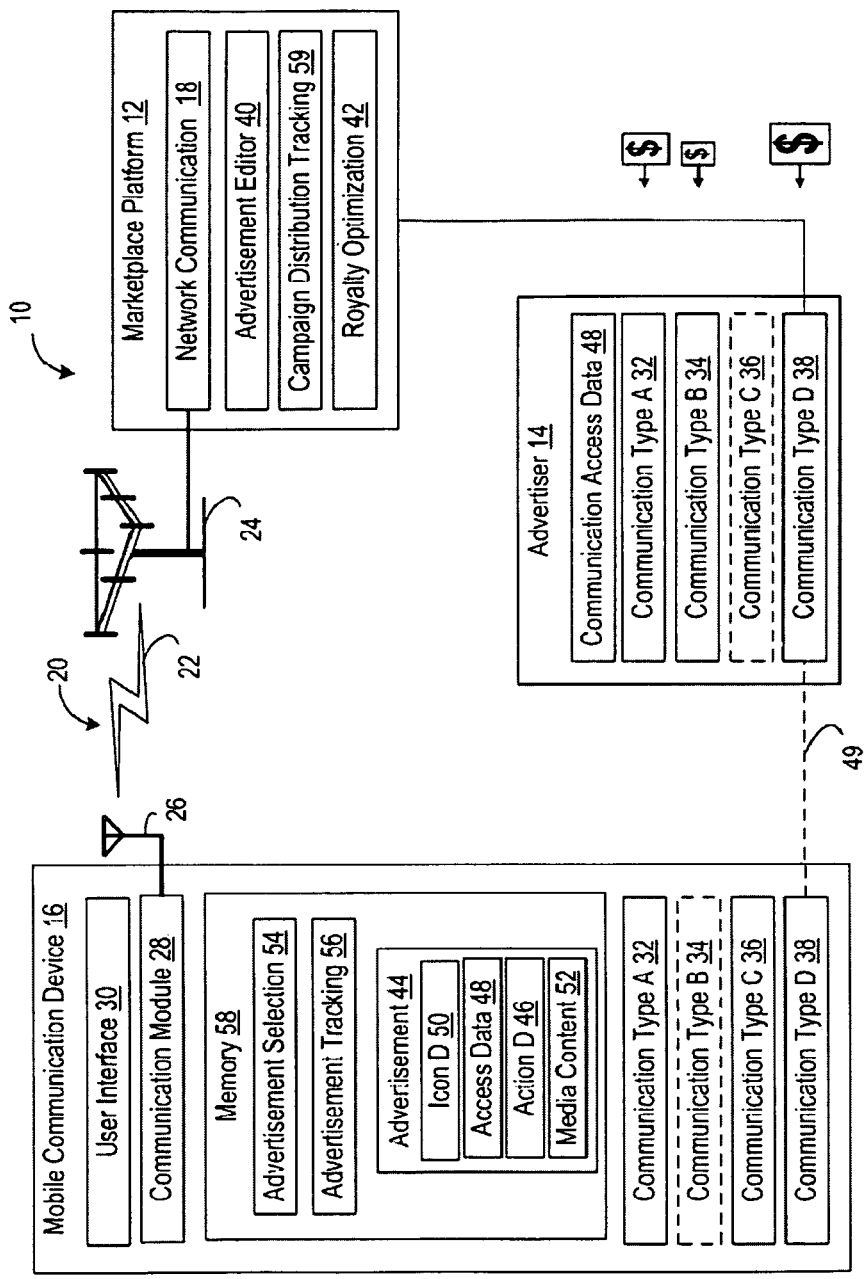
FIG. 1 illustrates a communication system for deploying action icons to mobile communication devices, according to one aspect.

Referring to FIG. 1, according to one aspect, a communication system 10 facilitates creation, deployment and tracking by a marketplace platform 12 of an advertising campaign on behalf of an advertiser 14 to a population of mobile communication devices 16. The marketing platform 12 utilizes network communication component 18 to participate in a communication network 20 that forms a communication link, depicted as a wireless data packet air interface 22, between a network radio access technology 24 and an antenna 26 of the mobile communication device 16. The marketplace platform 12 can optimize the advertisement campaign to reflect constraints of the mobile communication device 16, interactions allowed by the advertiser 14, and further royalty-bearing preferences of the advertiser.

Mobile communication devices 16 can have a communication module 28 that is constrained in the types of communications performed. These constraints can be technical or programmatic, the latter referring to subscriber agreements with the communication network 20 or other external factors. For example, the device could support Short Message Service (SMS) (i.e., text messaging), web browser, email, telephone service, etc. In some instances, a user interface 30 of the communication device 16 can impose limitations or preferences as well for types of communication. For example, a display size, available input devices (e.g., dual tone multi-frequency (DTMF) keypad versus a QWERTY keyboard), etc., can make certain interactions with an advertiser feasible or desirable. For aspects in which the communication device 16 is mobile, the air interface 22 can dynamically change, such as reduced throughput situations that warrant changing options for interacting with an advertiser 14. In the depiction of FIG. 1, these constraints/capabilities are illustrated for the advertiser 14 regarding a communication type A 32, type B 34, type C 36 and type D 38, wherein communication type C 36 is not enabled. The constraints/capabilities for the communication device 16 are that communication type B 34 is not being enabled. Thus, an advertisement editor 40 of the marketplace platform 12 can implement a subset of the available communication types A, D 32, 38 for defining an advertising campaign suitable for the communication device 16 to interact with the advertiser 14.

To enhance the value to the advertiser 14, and thus the royalty-bearing potential for the advertising campaign, a royalty optimization component 42 of the marketplace platform 12 considers that one communication type D 38 has a greater value to the advertiser 14, which is depicted as an advertisement 44 have been created by the editor component 40 including an Action D 46 for accessing communication type D 38 of the communication device 16 as specified by access data 48 specific to the advertiser 14 to perform an interaction as depicted at 49. An icon D 50 paired with the action D 46 intuitively suggests the type of action D 46 to a user. Media content 52 of the advertisement 44 communicate information or excitement to assist in prompting user interaction with the icon D 50. An advertisement selection component 54 and an advertisement tracking component 56 both also resident in memory 58 of the communication device 16 recognize opportunities to present and track respectively the advertisement 44 that satisfy a reach-frequency-time goal for the advertising campaign, reporting both the opportunities presented and user responses in some instances to a campaign distribution tracking component 59 of the marketplace platform 12.

It should be appreciated with the benefit of the present disclosure that action definitions, icon graphics, and assignment of a particular icon graphic to an action definition and to a particular advertisement can be separate communications. For example, a mobile communication device 16 can be configured by the original equipment manufacturer (OER) to have a plurality of selectable actions (e.g., click to call, click to text message, etc.). At some point, each action can be associated with one or more icons that graphically suggest the function. A plurality of such icons for each action can be desirable for different user preferences, style considerations appropriate for a particular advertisement, correlation with other graphical user interfaces that have connotations to the user or to the advertiser, etc. Provisioning the mobile communication device 16 in advance can also yield throughput efficiencies by not requiring icon graphics or action instructions to be resent with each advertisement.

It should be appreciated that the royalty optimization component 42 can address additional factors, such as the likelihood that a user will respond to a type of communication (action). For example, a pattern of usage can indicate that a particular user prefers not to use his communication device for browsing to a website but instead is receptive to click-to-call actions to speak with an advertiser. A higher probability of a user action of a lower royalty-bearing interaction can be the optimum solution for a particular communication device 16. Revenue optimization can be a distributed function, with each mobile communication device 16 optimizing based on factors such as a value given to each type of action, filtering for actions available on the device 16, and behavioral preferences either implicit or explicitly established for the user, etc.

FIGS. 2, 4, and 8-16 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 2:
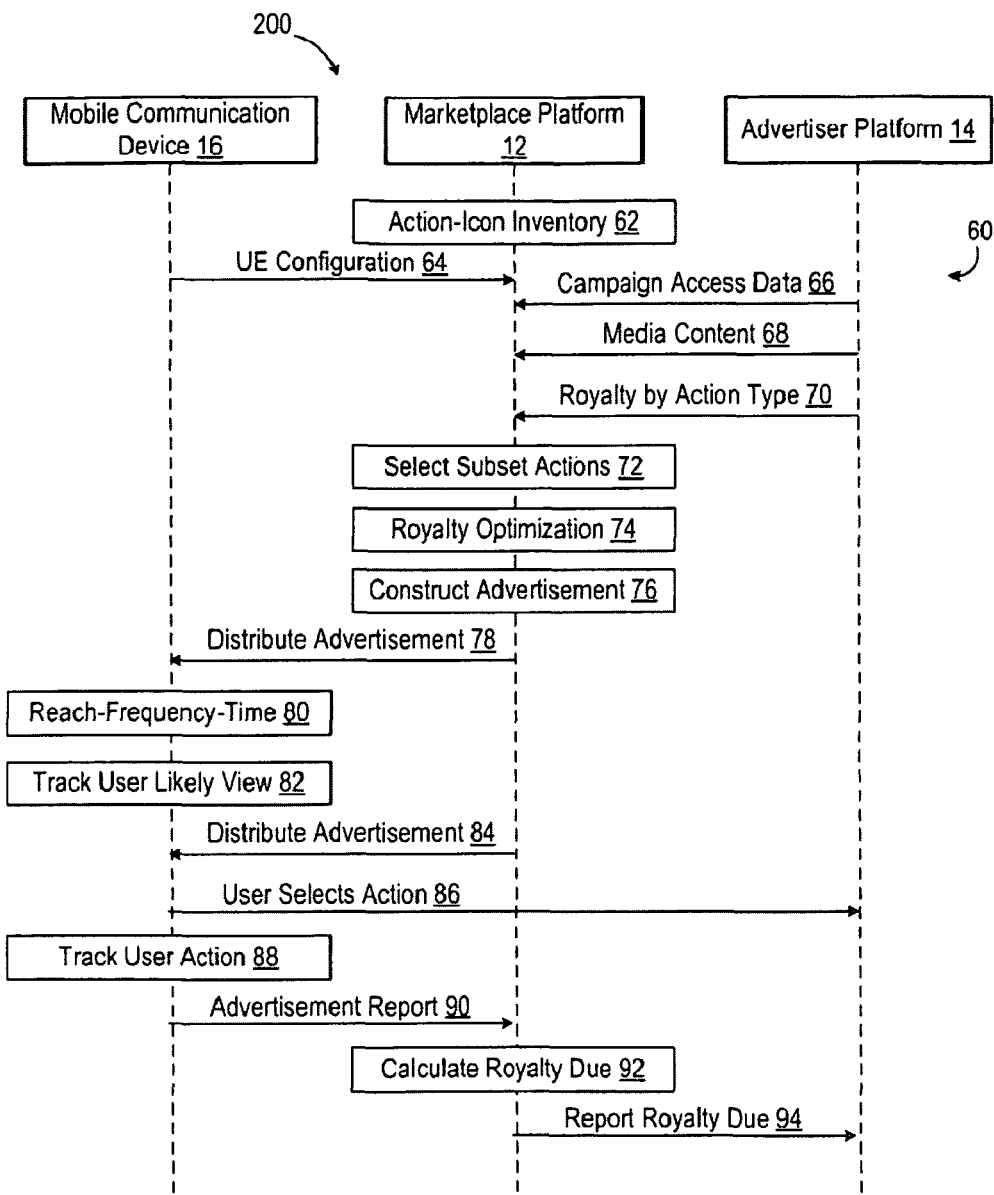
FIG. 2 illustrates a methodology for deploying action icons to mobile communication devices, according to another aspect6.

Referring to FIG. 2, methodology 60 for multiple actions and icons in mobile advertising is depicted between the marketplace platform 12, advertiser 14, and mobile communication device 16, according to one aspect. An inventory of paired action-icons are maintained that are intuitively explanatory (block 62). Configuration information for a population of mobile communication devices 16 are conveyed to the marketplace platform 12 (block 64). This configuration information can specify what types of advertising actions are feasible, desired, or effective. The advertiser platform 14 provides campaign access data for targeting advertising actions (block 66). Examples can be voice telephone numbers, websites, brochure download links, an email address, etc. Media content can also be conveyed (block 68). For example, trademark logos and advertising slogans can be incorporated. Preferences for actions are conveyed from the advertiser platform14 to the marketplace platform 12 (block 70).

The marketplace platform 12 determines a subset of actions that are suitable to both the mobile configuration device 16 and to the advertising platform 14 (block 72). Royalty optimizations are performed, which can entail maximizing a royalty to the marketplace platform 12 (block 74). An advertisement is constructed that is suitable for disseminating to the mobile communication device and which contains advertiser access data, presentation goals for reach-frequency-time for the population of mobile communication devices and a particular targeted device, and action-icon(s) (block 76). The advertisement is distributed to the mobile communication device 16 (block 78). For example, the advertisement can be an image suitable for a requesting/receiving mobile communication device chipset and software platform.

At suitable time, the reach-frequency-time selection component monitors device usage in order to post a new advertisement (block 80). For example, the user can be interacting with the user interface such that there is a reasonable likelihood that the user will perceive the advertisement. This presentation is logged for tracking this likely viewing by the user (block 82). It should be appreciated that viewing can include or be substituted for haptic or audible advertisements. Should the device 16 need additional advertisements, the marketplace platform 12 can periodically or upon request distribute more (block 84). It should be appreciated that the royalties can be based upon the reach-frequency-time tracking, such as for image advertising that does not necessarily result in many or any direct contacts to the advertiser.

Should the user select the action-icon and interact with advertiser, the mobile communication device 16 performs the prescribed action in accordance with the access data to the advertiser platform 14 or wherever this follow-on action is directed (block 86). For example, fulfillment could be facilitated by the network operator. The device 16 or the marketplace platform 12 tracks this user action (block 88), which can include an advertisement report to the marketplace platform (block 90), which in turn calculates a royalty due (block 92) and transmits a royalty due report to the advertiser platform 14 (block 94).

In an exemplary implementation, action icons can be introduced into an end-to-end mobile advertising system that provides a marketplace platform that characterizes user behavior (e.g., location, interaction with advertisements on a mobile communication device, etc.) in order to select micro-targeted advertisements from an advertisement platform. The marketplace platform handles the formatting required for presentation suitable for communication devices. The advertisements are presented in accordance with negotiated tags for a suitable audience ("reach"), for a suitable number of presentations ("frequency") and for an effective duration ("time") within a particular scheduled window. A time coupon advertisement campaign is also supported where advertisement include a schedule metric. Effectiveness is gauged even in the instance of impression advertisements by monitoring user location and/or interaction with the communication device to determine a change in behavior (e.g., does not go to a competitor as forecasted, does go to a location of the advertiser, calls the advertiser, clips the advertisement for future reference, etc.). This effectiveness is further tracked across applications and/or platforms to capture reach, frequency, and duration of a particular advertising campaign for a user. Not only does the marketplace platform handle the interfacing for the particular format needs of mobile communication devices, the marketplace platform secures user identification for privacy reasons from advertising entities that provide the advertisements.

Figure 3:
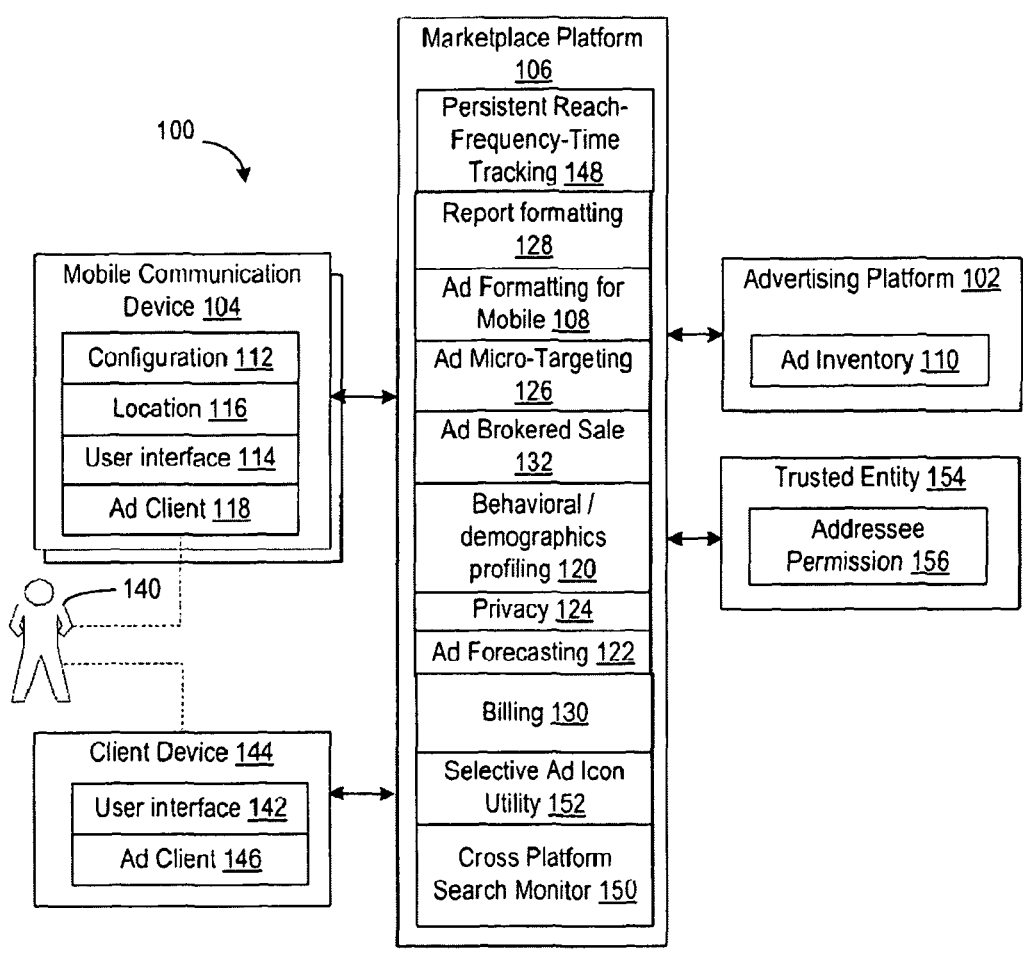
FIG. 3 illustrates a block diagram of an end-to-end mobile advertising communication system, according to yet another aspect.

Referring to FIG. 3, a communication system 100 provides an end-to-end solution for advertisers to extend the reach of their advertising platforms 102 to a population of client devices, depicted as mobile communication devices 104, even though the mobile communication devices 104 have display, communication bandwidth, and user interaction that differ markedly from other communication channels used by the advertising platforms 102, according to one aspect. A marketplace platform 106 provides the interface between the advertising platforms 102 and the mobile communication devices, handling the specific needs of mobile communication devices 104. For example, the marketplace platform 106 includes a formatting component 108 that formats advertisements on behalf of the advertising platform 102 so that the advertisers can maintain one advertising inventory 110 used for other advertising distribution and communication channels (e.g., web portals, etc.). Thus, the advertising platform need not keep up to date with a myriad of presentation constraints for each configuration 112 of mobile communication device 104. Thus, the advertisement can be presented in a suitable rendering with suitable interaction options in accordance with a user interface 114 of the particular mobile communication device 104.

The marketplace platform 106 provides additional value to advertisers by determining a "reach" of the population of mobile devices 104. Not only does the marketplace platform 106 know the capabilities for presentation of advertisements, behavior of the user is sensed via the user interface 114 (e.g., call history, interaction with mobile advertisements, etc.) and/or by a location sensing component 116 of the mobile communication device 104. These behavior indications are reported by an advertising client 118, also resident on the mobile communication device 104. Thereby, the marketplace platform 106 can go beyond "suspect" demographic data about the mobile communication devices 104 by storing behavioral and demographics data in a database 120. An advertisement forecasting component 122 analyzes this data in order to characterize the directly sensed or interpreted behavior of a user of the mobile communication device 104.

When the mobile communication device 104 needs additional advertisements, the advertising client 118 makes a request, which is forwarded by the marketplace platform 106. While achieving the latter, individual identifications are filtered out with a privacy component 124, such that the advertising platform 102 knows only a characterization of the mobile communication device 104. Alternatively, the marketplace platform 106 has access to a range of advertisements in the advertisement inventory 110 of the advertising platform 102 and utilizes an advertisement micro-targeting component 126 to select appropriate advertisements for the requesting mobile communication device 104 in accordance with a characterization maintained by the advertising forecasting component 122. The mobile communication device 104 presents the advertisement on the user interface 114 and reports the usage via the advertising client 118 to the marketplace platform 106. The data can be processed by a report formatting component 128 in accordance with a data format compatible with the advertising platform 102 so that advertisers can assess the effectiveness of an advertisement campaign. The advertisement tracking data can also be processed by a billing component 130, especially in instances where the amount of payment owed to the marketplace platform 106 is related to the advertisement tracking data. In instances where users have interacted in a way with the user interface 114 indicating a desire to purchase goods or services associated with a presented advertisement, the marketplace platform 106 can provide an advertisement brokered sale component 132, leveraging current billing avenues, authentication methods, and privacy filters in order to facilitate a transaction between the advertising platform 102 and a user of the mobile communication device 104.

The reach, frequency, and time of exposure to advertising can be extended to capture instances in which a user 140 can be exposed to the same advertisement campaign across multiple computing environments (e.g., applications, devices, etc.). For instance, the user 140 interacts with one client device (e.g., mobile communication device 104) whose user interface 114 is capable of presenting multiple applications (e.g., WAP browser, game console, communication device menu, etc.). Alternatively or in addition, the user 140 can interact with a second user interface 142 of another client device 144 that also has an advertising client 146 that responds to the marketplace platform 106. A persistent reach-frequency-time tracking component 148 of the marketplace platform 106 instructs the mobile communication device 104 and client device 144 and receipts reports as to partial compliance with the exposure metrics in order to determine when an advertising target has been satisfied.

An example of such persistent reach-frequency-time advertising would be a fourteen-year-old boy Joey whom the marketplace platform 106 has determined to be a skateboard enthusiast based upon behavior (e.g., search performed on a WAP browser on the mobile communication device 104, frequent proximity to a skateboard recreation center, solicited opt-in, etc.). A sports shoe manufacturer can have an advertising campaign that promotes use of their product in skateboard events and has selected a classification of users like Joey to receive their advertisements. In particular, the campaign specifies that each recipient of the appropriate inclination (i.e., reach) is to receive the advertisement at least four times (i.e., frequency) for a total of thirty seconds duration (i.e., time). Opportunities to satisfy this exposure metric can be realized in part when Joey selects to play a skateboarding game on his mobile communication device 104. Another portion of the exposure time can occur when Joey accesses a financial webpage to view his stock values. Another opportunity for presenting the advertisement can occur when viewing a home screen of the user interface 114 upon initial activation, implying that Joey is viewing the client device 104.

As another example, a young adult Chris can interact occasionally with a number of different client devices 104, 144 including a personal cell phone with a graphical user interface, a wirelessly enabled portable game console, a cell phone-enabled handheld or tablet device largely used for email, etc. The marketplace platform 106 can be associated with more than one of these devices (not shown), associating their use with the same user, and thus a selected advertising campaign, enabling additional opportunities to complete the required frequency and/or duration of exposure to an advertisement.

In some applications, the user 140 passively interacts with the second client device 144, such as viewing a dynamic public advertisement (e.g., active billboard). Determination of this passive interaction can be determined by the persistent reach-frequency-time tracking component 148 correlating location data from the location sensing component 116 of the mobile communication device 104 with a sensed or predetermined location of the client device 144. This can be micro targeting of advertising, such as instances in which only one or a few individuals are capable of seeing the dynamic advertising display. Alternatively or in addition, the dynamic public advertisement platform can be a large dynamic display that is simultaneously viewed by a larger population, such as alongside a highway or at a busy pedestrian thoroughfare. A revenue optimizing system for dynamically changing the advertisement presented can benefit from feedback regarding the current demographic and/or behavioral profile characterization of some, many, or all of the viewers. Thus, a generally applicable soft drink advertisement could be the default advertisement presented.

For example, an advertisement event is triggered when twenty users are detected as having a classification as professionals in a certain medical specialty, due to the proximity of a convention or hospital, for which a pharmaceutical or medical device manufacturer is willing to pay a premium advertising rate per capita. As another example, a sporting event then concludes and a large influx of sports fans leave. The sheer number of fans changes the optimum revenue generating advertisement to one with a lower premium per capita, but an overall larger value. The optimization could further take into consideration the relative rate of travel of the population to change the advertisements in a way to provide effective exposure balanced against opportunities to sell additional advertisement time.

The monitoring across computing environments of various applications on a client device 104, or even to other client devices 144 for opportunities to present advertisements can be further leveraged to capture user behavior for reporting to the marketplace platform 106. For example, the user 140 can enter keywords into a WAP browser search engine that are captured. Navigating links provided on a portal webpage can be tracked. Selection of media content, game content, utilities applications for download and use can be tracked. Interactions with certain classes of advertisements that are sent in an untargeted fashion to the population of mobile communication devices 104 can be noted. To the extent permissible, communicating with certain business entities (e.g., telephone calls) can be captured. Thus, the unique interaction forms provided by certain mobile communication devices 104 can enhance behavior profiling of a user for targeted micro advertising. Coordination or control of such keyword characterization can be performed at a cross platform search monitor 150 with functionality provided by the advertisement clients 118 and 146.

A further enhancement to the device UI can be provided by multiple actions, represented by icons, used in conjunction with the user interface 114 that are activated based upon for the user's choice of response to an advertisement, especially those facilitated by the communication features made available by the mobile communication device 104. Alternatively or in addition, the actions can be selected based on the advertiser's preferences. Alternatively or in addition, the actions can be selected based on a propensity for generating revenue for the marketplace platform 106.

The marketplace platform 106 can utilize a selective advertisement action utility 152 to incorporate such actions and icons and functionality into the advertisement distributed to the mobile communication device 104. For example, some advertisers hope to drive the user to website, to a telephone customer service number, to an email response, a short message service (SMS) text response, a click to buy shopping cart interface (e.g., payment and shipping information handled through the operator's billing contract with the user of the mobile communication device 104). A click-to-coupon action, represented by an icon or other means, can allow the mobile communication device 104 itself to serve as a hand carried "coupon," perhaps presenting a redemption code or rendered barcode for the retailer to accept or for the user to enter online. A click-to-promotion action can allow the marketplace platform 106 to selectively target discounts to particular classes of users, or perhaps an individual user.

Since different kinds of interactions with an advertisement tend to have different value to an advertiser, the selection of actions presented can be placed in a descending order of priority, or could result in a different remuneration value to the marketplace platform 106. For example, a click-to-buy action could have the highest value, although this may be inappropriate for the contractual arrangement with the mobile communication device 106 (e.g., underage youth) or not be suitable for the type of advertisement (e.g., impression advertising for a service). A second tier could be a direct contact with the advertiser (e.g., click-to-call, click-to-email, or click-to-text). A lower tier could be those interactions that show some interest only (e.g., click-to-locate, click-to-content, click-to-save (the advertisement or coupon), etc.).

Although privacy for the users is beneficial for placing the marketplace platform 106 between the advertising platform 102 and the user 140, in some applications a consumer-to-consumer advertising functionality can be facilitated by the communication system 100. The marketplace platform 106 can serve as a broker that makes the introduction for an advertiser to a user 140 who can opt in for direct marketing campaigns. As another example, an individual or association ("trusted entity") 154 can obtain indicia 156 of addressee permission, such as a code or password that enables access to direct marketing features. For example, a professional association can obtain contractual permission for their organization through registration and negotiate with the marketplace platform 106 for a direct advertisement to their members, such as facilitating acceptance of enrolling in a seminar. As another example, a friend could schedule for a birthday advertisement to be prominently displayed within a circle of friends, providing a higher likelihood of being noticed over other message formats yet without the inconvenience of leaving many voicemails. As yet another example, an advertiser is only willing to provide a special discount to certain users who are in a special status, such as very frequent flyer on a certain airline. A targeted click-to-coupon could be sent to such an individual without making such an offer widely available to those the advertiser chooses to discriminate.

Figure 4:
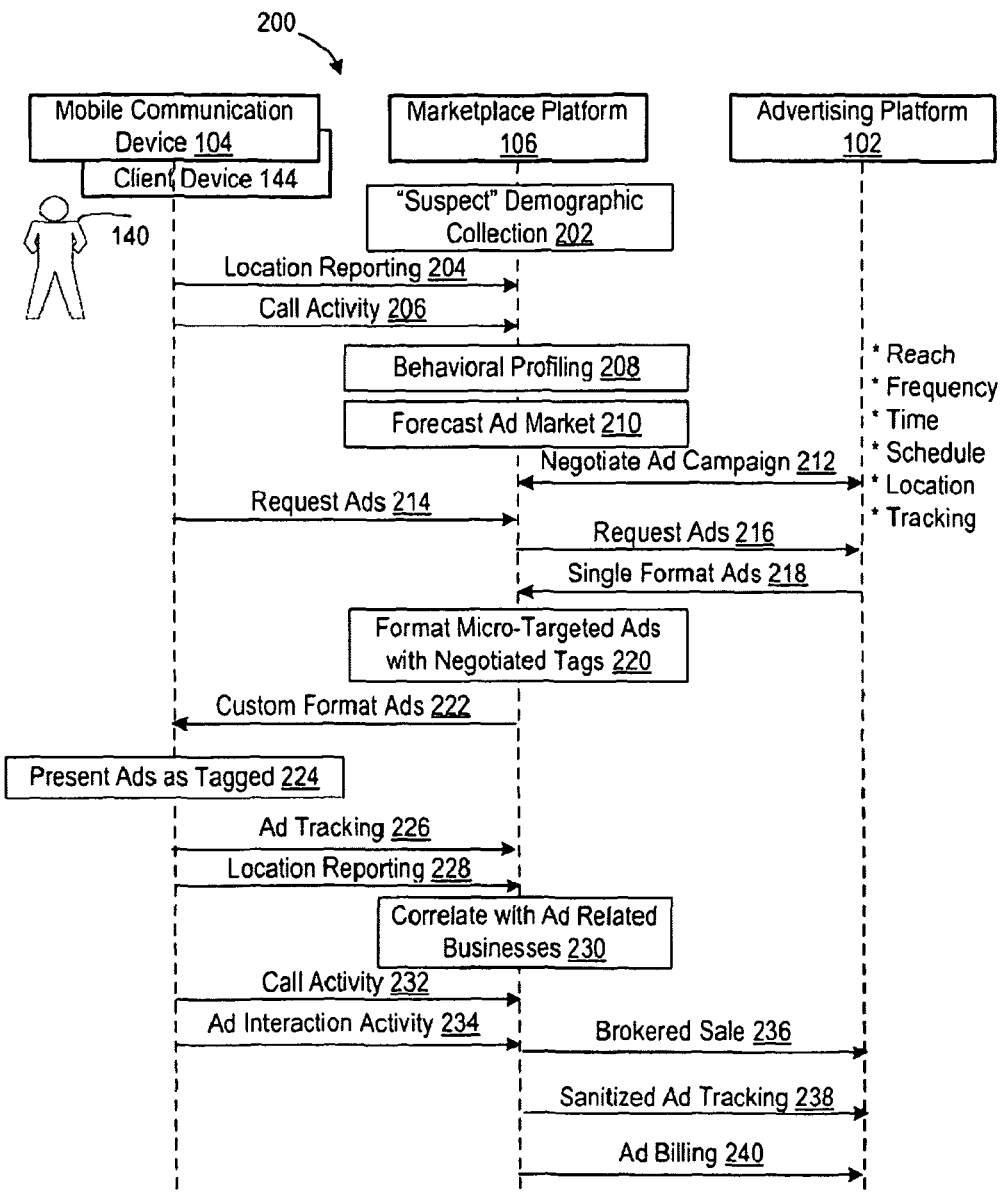
FIG. 4 illustrates a timing diagram of a mobile device, marketplace platform, and advertising platform of the end-to-end mobile advertising communication system, according to another aspect.

In FIG. 4, a methodology 200 for end-to-end mobile advertising is depicted by interactions between the mobile communication device 104, the marketplace platform 106, and the advertising platform 102, according to one aspect. It should be appreciated that the user 140 can utilize also a client device 144 that need not be mobile with the marketplace platform 106 in some applications coordinating certain of these communication steps with either or both devices 104 and 144. The marketplace platform 106 begins by processing a collection of demographic data in block 202. Such data has value, but is denoted as "suspect" in that users do not always provide accurate or complete self-assessments for a number of reasons. This demographic data is augmented at 204 by location reporting provided by the mobile communication device 104 to the marketplace platform 106. This location data can be approximate, given a current cell or wireless node from which the communication originates. This location data can be accurately determined from a Global Positioning System (GPS) engine incorporated into the mobile communication device 104, sufficiently accurate to identify the location of the user to specific physical addresses. In addition, user behavior is provided by call activity, depicted as reports at 206. This collected user behavior data is analyzed for behavioral profiling at block 208. As used herein, a behavioral profile encompasses the demographic variables, behavior variables, and other information that goes toward IAO variables (i.e., interests, attitudes, and opinions), although it should be appreciated that some applications consistent with aspects herein may be confined to a subset of such variables.

In block 210, the marketplace platform 106 performs a forecast of the advertising market of the mobile communication devices 104. For example, current advertising usage and the usage of the mobile communication devices 104 overall can be combined with propensity of certain users of mobile communication devices 104 to benefit from a particular advertiser based on the behavioral profiling. This ad forecast can serve as a basis for negotiating an advertisement campaign with the advertising platform 102, as depicted at 212. The campaign can be defined in terms of reach (e.g., a subset of users of mobile communication devices 104 with a high correlation for the goods or services based on behavioral profile), frequency of advertisement presentations to each user, the cumulative viewing time of an advertisement for each selected user, and/or a location limitation for users proximate to a competitor or the advertiser's business locations. An advertisement campaign can be constrained to a particular calendar schedule with limitations on a begin time and/or an end time. The schedule constraint can also comprise a time of day schedule limitation for campaigns that focus on users who are active at a particular time, such as those who would be influenced to visit a restaurant close to dinner time or to attend a concert. The marketplace platform 106 can also provide tracking of advertisement usage that can serve as a valuable feedback tool for the advertisers to determine effectiveness. The tracking can also serve as a basis for valuing the end-to-end mobile advertising services of the marketplace platform 106.

With the advertising campaign set up, when a mobile communication device 104 signals the marketplace platform 106 at 214 that additional advertisements are needed, the marketplace platform 106 requests single-format advertisements from the advertisement platform at 216. The advertising platform 102 provides the single format advertisements at 218.

At block 220, the marketplace platform 106 formats one or more advertisements into a format suitable for the requesting mobile communication device 104. The marketplace platform 106 micro-targets the advertisements to those mobile communication devices 104 that are deemed to have an appropriate behavioral profile. Part of the formatting includes tagging metrics in accordance with the negotiated terms for the advertising campaign. Examples of these tags are frequency of presentation, duration of presentation, schedule window, location constraints, etc. The custom formatted advertisements are sent from the marketplace platform 106 to the mobile communication device 104 at 222.

At 224, the mobile communication device 104 presents the advertisements in accordance with the tagged metrics. The tracking of advertisement usage by the mobile communication device 104 is reported intermittently to the marketplace platform 106 as depicted at 226. In addition, some aspects include location reporting as depicted at 228. With this advertisement and location tracking, the marketplace platform 106 correlates the advertisement presentation with the location of the user against a database of monitored locations (e.g., competitors, advertiser's business locations, etc.) in order to infer success or failure of impression advertisements. The mobile communication device 104 in some aspects reports call activity as depicted at 232, such as dialed directly by the user or automatically dialed by using a "click to dial" feature of the mobile communication device 104. In some aspects, at 234 the mobile communication device 104 can report advertisement interaction activity (e.g., "click to clip" to save the advertisement for future review by the user, "click to glance" to launch a window to view the advertisement or a more detailed version of the advertisement, "click to locate" to guide the user to the location of the advertiser, etc.).

The tagged metrics can facilitate the user behavior by providing information or active content that direct the user toward the behavior that is to be tracked. In some instances, an advertiser may specify that only certain kinds of user behavior are to be tracked, or certain behaviors are weighted more heavily as indicating an effective advertisement. For example, a click to locate action can be a stronger indication than a click to save, which in turn can be a stronger indication than a location proximity that is not necessarily proof of visiting the advertising business.

At 236, based on the reported usage data, the marketplace platform 106 can have an opportunity to perform a brokered sale with the advertising platform 102 based on certain kinds of user interactions with the advertisement. At 238, based on the reported usage data, the marketplace platform 106 can report depersonalized advertisement tracking data to the advertising platform 102. This depersonalization can summarize the data into a format conforming to the data of interest to the advertiser. The depersonalization can replace individual identification with a categorization of the consumers of the advertisement in order to preserve user privacy. At 240, the marketplace platform 106 can report advertisement billing, such as basing the amount due as corresponding to the usage tracking.

Figure 5:
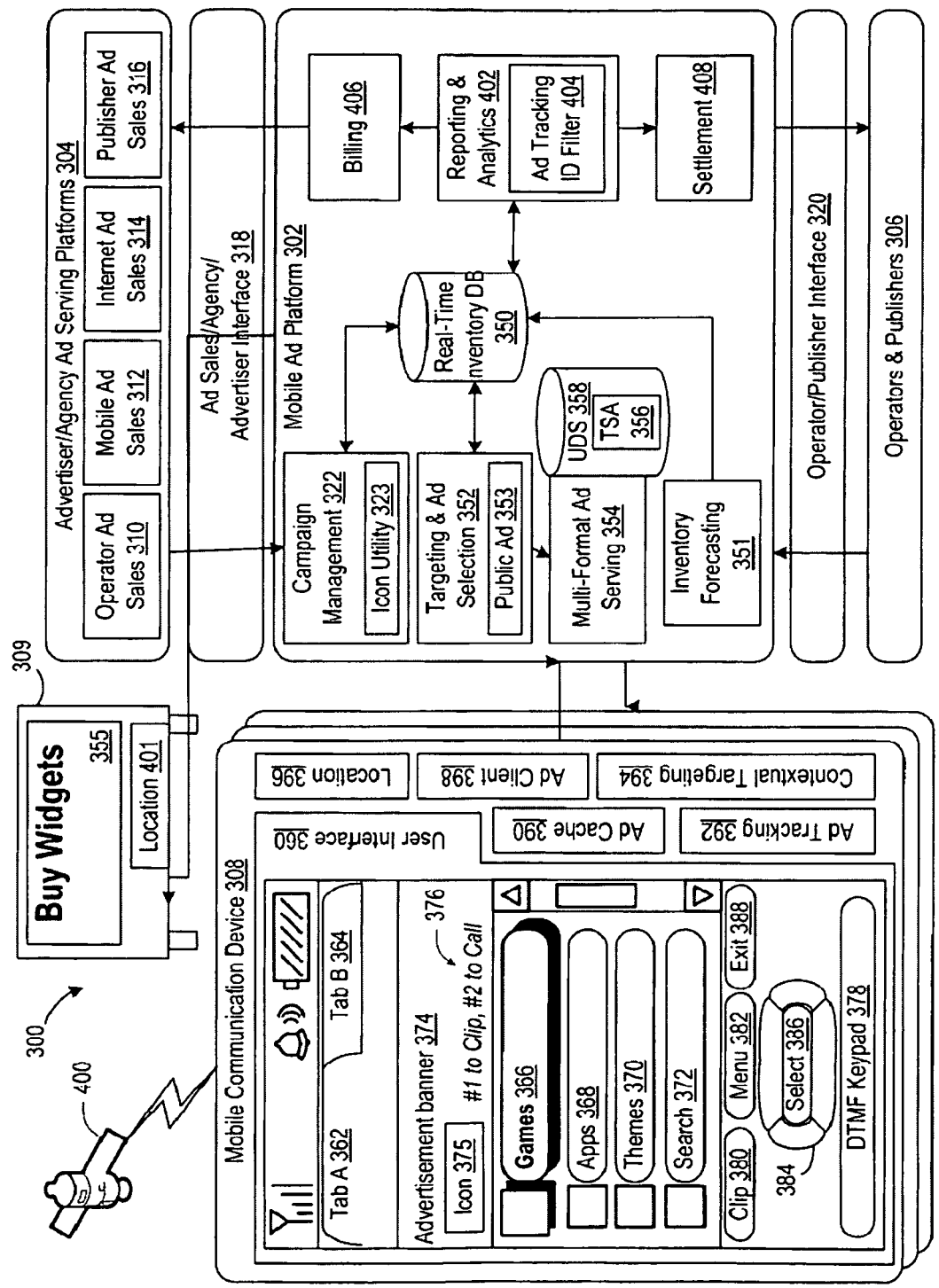
FIG. 5 is a schematic diagram of an illustrative end-to-end mobile advertising communication system, according to still another aspect.

In FIG. 5, an exemplary communication system 300 benefits from a mobile advertisement platform 302 that interfaces between advertiser/agency advertisement serving platforms 304, operators and publishers 306, and a population of mobile communication devices 308, in accordance with one implementation. It should be appreciated that a particular user 140 (FIG. 3) may use more than one mobile communication device 308, which can be coordinated by the mobile advertisement platform 302 to accomplish certain advertisement objectives. The user can also interact with an immobile client device, depicted as a dynamic public advertisement display device (e.g., billboard, television, computer workstation, waiting room display, public conveyance signage, etc.) 309. The mobile communication device 308 provides indications of user interaction (e.g., pattern of movement) that when related to the type of immobile client device 309 can indicate exposure to advertisement. For instance, movement toward a large display is indicative of likelihood of seeing the advertisement. The advertising serving platforms 304 can comprise operator advertising sales 310, mobile advertising sales 312, Internet advertising sales 314, and/or publisher advertising sales 316, etc., whose particular communication protocols are accommodated by an advertisement sales/agency/advertiser interface 318 to communicate with the mobile advertisement platform 302. In some aspects, operators (e.g., wireless/cellular carrier) 306 can perform functions such as billing and assisting in estimating an available population of mobile communication devices 308 by communicating with the mobile advertisement platform 302 via an operator/publisher interface 320. The mobile advertising platform 302 includes a campaign management component 322 that allows an administrator to select appropriate formatting and metric tagging. This campaign management 322 can further include an action management utility 323 that assists in selecting an icon for the action that are suggestive of the types of communication options afforded by mobile communication devices, and assists in defining a workflow invocation command and parameters for the action (e.g., email, direct purchase, call, text message, save, navigate to content, etc.) as well prompting to those options appropriate to the advertiser and/or preferred by the marketplace advertisement platform 302 for potential for revenue generation.

Figure 6:
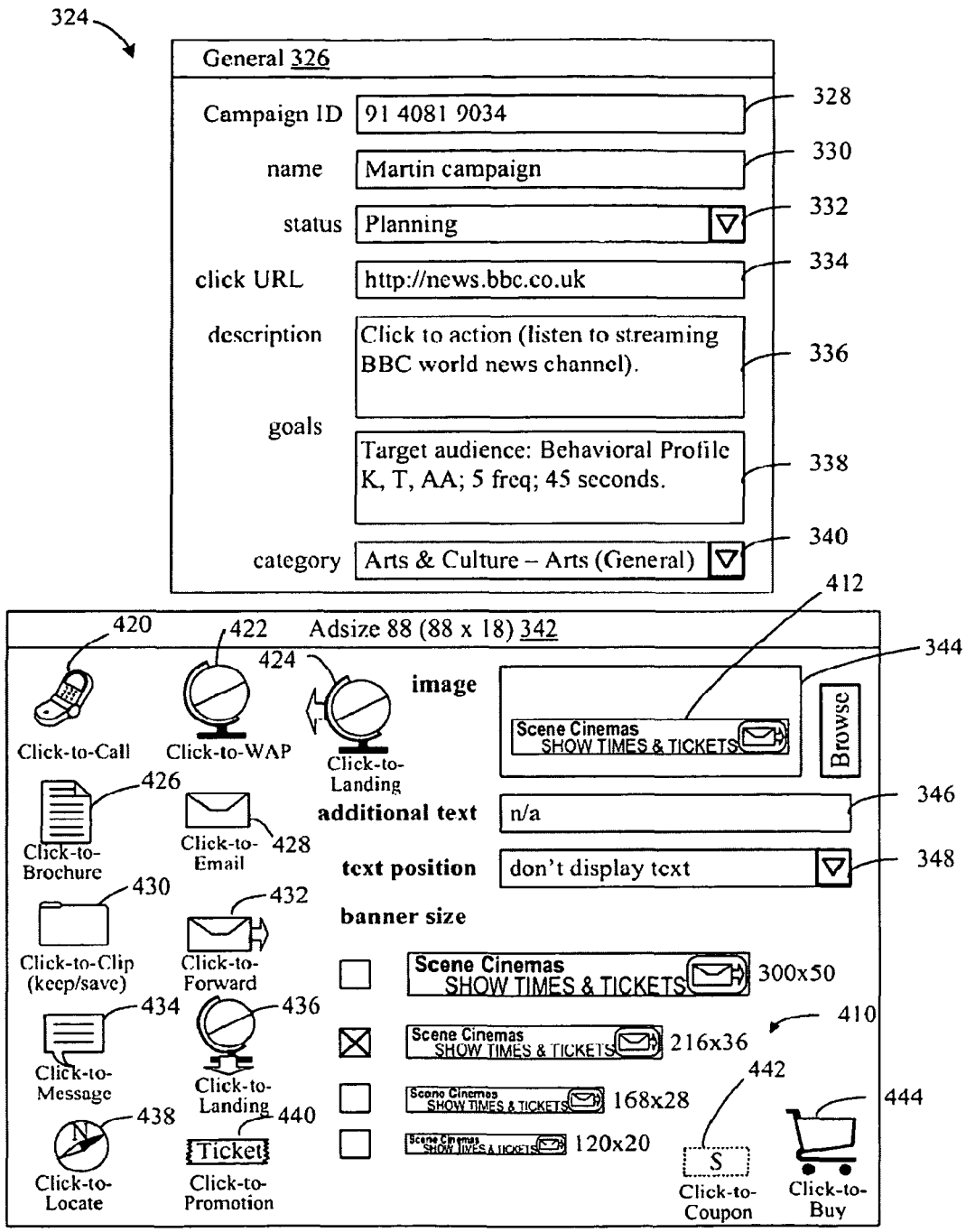
FIG. 6 is a diagram of an illustrative graphical user interface for campaign management of the communication system of FIG. 5, according to yet another aspect.

In FIG. 6, in an illustrative graphical user interface 324 includes a general window 326 that enables a user to enter a campaign identification entry field 328 (e.g., 91 4081 9034), a campaign name entry field 330 (e.g., Martin campaign), a campaign status pull-down menu 332 (e.g., planning), a click-to-action link 334 (i.e., uniform resource locator (URL), e.g., http://news.bbc.co.uk), a campaign description entry field 336 (e.g., click to action—listen to streaming BBC world news channel), campaign goals entry field 338 (e.g., target audience, behavioral profile categories K, T, AA, frequency 5, time duration 45 seconds), and a category pull-down menu 340 (e.g., Arts & Culture—Arts (General)), according to one aspect.

In an exemplary version, both the mobile communication devices 308 are BREW-enabled. The Binary Runtime Environment for Wireless® (BREW®) software, developed by QUALCOMM Incorporated of San Diego, Calif., exists over the operating system of a computing device, such as a wireless cellular phone. BREW® can provide a set of interfaces to particular hardware features found on computing devices. As such, the click-to-action link 334 can include a BREW "click URL" or other instructions as to how the user can interact with the advertisement (e.g., click to clip, click to call, click to glance, etc.).

The graphical user interface 324 also provides a specific configuration for a subset of the mobile configuration devices 308 operating with a specific chipset, hardware, and/or software configuration. In an illustrative window 342, the user has selected a mobile advertisement size of 88, which is defined as 88 pixels wide by 18 pixels high. An image selection field 344 allows the campaign administrator to select an image, such as an image provided by the advertiser that has been manually resized or automatically cropped and reduced and/or changed in color palette by the widow 342. Additional text entry field 346 may be used, such as for instructions for displaying how to interact with this advertisement that is specific to this configuration of mobile communication device 308. A text position pull-down menu 348 can position this additional text, or omit it altogether as in given in the example.

Returning to FIG. 5, the customized advertisements from the campaign management component 322 are stored in a real-time inventory database 350. Data provided by operators/publishers 306 can be processed by an inventory forecasting component 351 with forecast data stored in database 350, in accordance with one implementation. A targeting and advertisement selection component 352 matches advertisement requests from the mobile communication devices 308 with the customized advertisements in the inventory database 350. Such targeting can comprise a public advertisement component 353 that selects an advertisement display 355 of the immobile client device 309. The selection can be made based upon passive interaction of the user 140 (FIG. 3) as detected by the mobile communication device 308 moving into proximity of the immobile client device 309.

The communication protocol and advertisement format is translated by a multi-format advertisement serving component 354 to the mobile communication devices 308. In an illustrative aspect, a Triglet Service Adaptor (TSA) 356 of a uiOne™ delivery system (UDS) 358 performs the multi-format advertising serving function. The uiOne™ architecture developed by QUALCOMM Incorporated as part of BREW provides a set of BREW extensions that enable rapid development of rich and customizable UIs (i.e., active content, over-the-air (OTA) up-gradable), helps to evolve download business beyond applications, provides theming of part or entire handset UI, and utilizes BREW UI Widgets. Thus, BREW uiOne reduces the time to market for handsets, carrier customization, and consumer personalization. To do this, the BREW uiOne provides a clear set of abstractions, adding two new layers to the application development stack for BREW. The uiOne delivery system 358 is used to update mobile user interfaces (UIs) 360 over-the-air. This delivery system 358 can be deployed in a standalone fashion, allowing operators to leverage the functionality of their own delivery system. Additional benefits can be realized by deploying uiOne architecture with uiOne delivery system 358, especially when deployed in conjunction with other elements of the BREW solution (e.g. monetization and billing of downloadable UI packages when the operator does not already have the appropriate infrastructure).

It should be appreciated with the benefit of the present disclosure that incorporation of BREW, uiOne, etc., are illustrative and that application consistent with aspects herein can employ other computing environments, mobile operating systems, user interfaces, and communication protocols. For example, the user interfaces 360 can employ JAVA applets and operating environment.

The mobile user interface 360 thus configured in the illustrative version includes a tab A 362 and a tab B 364 (e.g., "mystuff", which can include clipped advertisements sub-folder). The depicted tab A 362 is selected, showing options, such as selected Games shopping option 366, an applications ("apps") shopping option 368, a themes shopping option 370, and a shopping search option 372. An advertisement banner advertisement 374 is displayed with additional text 376 (e.g., "#1 to Clip, #2 to Call) explaining how a user can interact with the advertisement 374, such as using a dial tone multi-frequency (DTMF) keypad 378, a dedicated advertisement interaction button (e.g., Clip) 380, and a menu button 382 to reach additional advertisement options perhaps used in conjunction with a steering buttons 384 and a select button 386. An exit button 388 allows backing out of a menu sequence. The advertisement banner 374 can also incorporate one or more icons 375 that graphically communicate what the interaction will perform as well as facilitating the action. Alternatively the icons can be presented within a menu or icon bar or other platform or implementation specific method.

The mobile communication device 308 provides functions that operate to support and monitor the user interaction with advertisements 374, such as an advertisement cache 390, an advertisement tracking component 392, a contextual targeting component 394, a location monitoring and reporting component 396, and an advertising client 398, which in the illustrative version is a BREW extension. The location monitoring and reporting component 396 can derive location from a Global Positioning System (GPS) 400. Alternatively, radio frequency identification systems, wireless access points, cellular direction finding, etc., can provide approximate location information about a mobile communication device that is temporarily screened from GPS reception or lacks an inherent location sensing capability. Immobile client devices 309 can have a predetermined location value 401 accessed by the mobile advertisement platform 302 rather than a sensed value. This location information can be utilized for public advertising in which passive interaction is surmised by the public advertising component 353 of the mobile advertisement platform 302.

The mobile advertising platform 302 stores the data received from the mobile communication devices 308 in the real-time inventor database 350. A reporting and analytics component 402 summarizes, filters, and formats the data received from the database 350, filtered of individual identification information by an advertisement tracking identifier filter 404. The prepared data is used by a billing component 406 that sends bills to advertising serving platforms 304 and/or by a settlement component 408 that interacts with operators and publishers 306.

Returning to FIG. 6, the window 342 can facilitate advertisement action and icon selection that is appropriate for the capabilities of the type of mobile communication device 308, appropriate for the communication avenues allowed by the advertiser (e.g., text messaging, emailing, webpage, telephone call, etc.), and/or optimum for revenue generating potential for the marketplace advertisement platform 302. A plurality of banner size selection radio buttons and depictions 410 can change the rendering of a selected banner 412 in the image selection field 344 to make it appropriate for a particular type of mobile communication device 308.

A range of actions, represented by their assigned icon, can be selected for incorporation, such as by drag and drop or by selecting. In some applications, those action icons are disabled (e.g., grayed out) if not appropriate for the particular advertisement, such as not having corresponding action information defined in general window 326, or if not available on the type of mobile communication device 308. Although not depicted, the selection can allow multiple actions to be added to the advertisement if supported by the mobile communication device 308. Alternatively or in addition, a hierarchy of preferred action choices when multiple choices are available can be specified with the first choice displayed. The action icon actually displayed on a particular mobile communication device 308 could be dynamically changed to accommodate a limitation on the user's contractual relationship or the local access network. For example, the user may not have paid for short message service or the service may not be available at a certain locale.

Examples of action icons that are suggestive of function as well as giving a wide range of interaction possibilities for advertisements include, but are not limited to, the following: (1) A click-to-call icon 420 dials the number as specified by the advertiser to encourage calling; (2) A click-to-WAP (wireless application protocol) icon 422 launches a browser allowing the user to manually type in a link provided on the advertising banner 412; (3) A click-to-landing icon 424 allows the browser to return to a prior page or a home page, which can be desired due to the slow page loading for mobile communication device 308 using a limited throughput wireless channel; (4) Click-to-brochure icon 426 renders a document depiction for additional information about the advertisement; (5) A click-to-email icon 428 sends an automated email response to the advertiser; (6) Click-to-clip (keep/save) icon 430 saves the advertisement for later accessing; (7) A click-to-forward icon 432 launches a utility to forward the advertisement to an addressee manually entered or one in their address book; (8) A click-to-message icon 434 accesses a short message utility pre-addressed to the advertiser; (9) A click-to-content icon 436 navigates to a web link provided by the advertiser; (10) A click-to-locate icon 438 pops up a map to the advertiser, perhaps the closest location with reference to location information from the mobile communication device 308; (11) A click-to-promotion icon 440 can activate information about how to enter a sweepstakes, contest, promotion, etc; (12) A click-to-coupon icon 442 can access a barcode, alphanumeric password, etc. for entering into a full browser, a mail-in redemption, or to show to a retailer on the mobile communication device 308 in order to access a discount deal; and (13) A click-to-buy icon 444 initiates a purchase transaction. In some applications, the service provider for the mobile communication device 308 can enhance the transaction by providing the shipping and/or billing information for the user associated with the device 308, including adding the purchase to the service billing.

Figure 7:
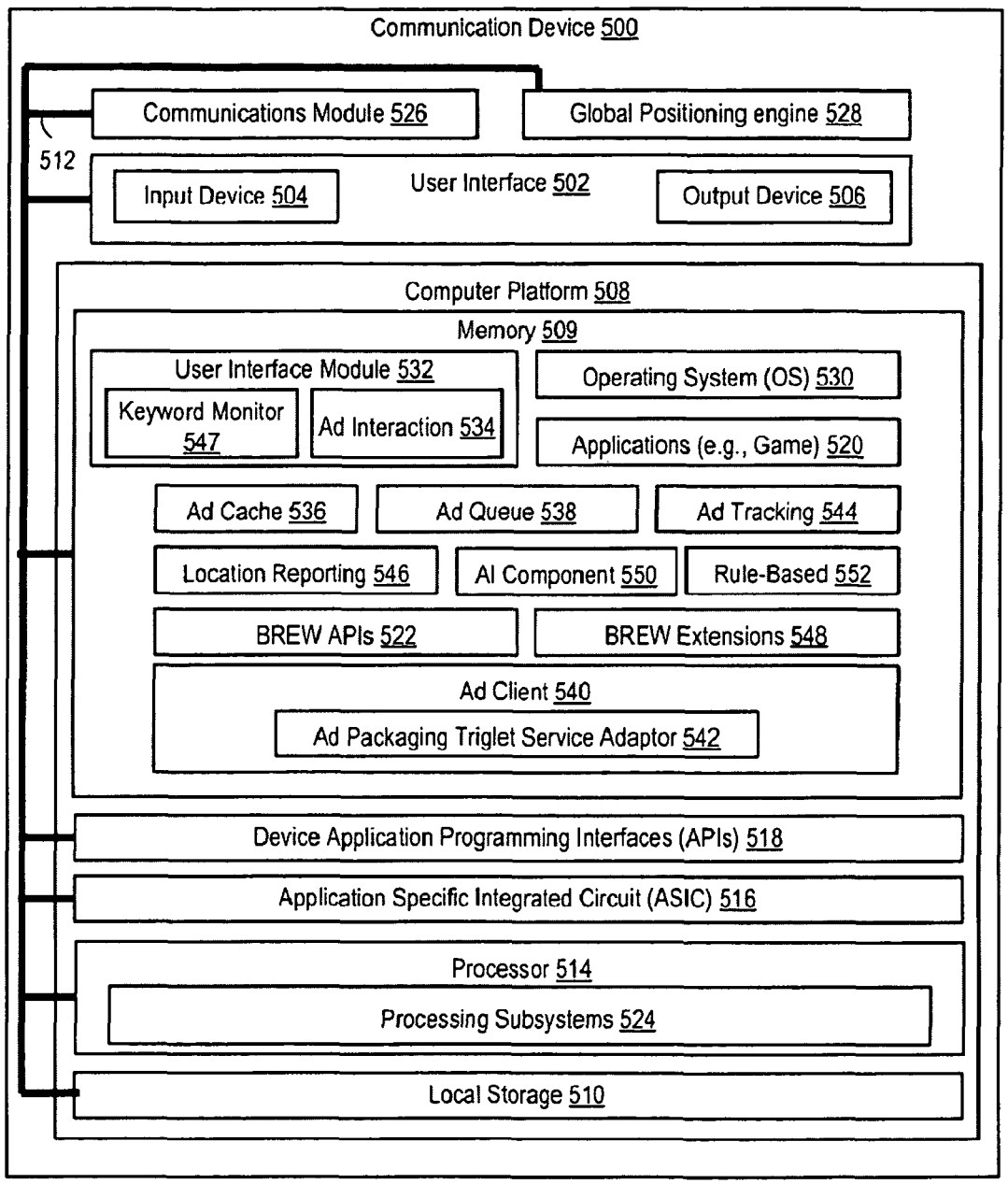
FIG. 7 is a block diagram of a mobile communication device of FIG. 5, according to one aspect.

In FIG. 7, an exemplary version of a communication system 500 is depicted according to some aspects as any type of computerized device, according to one aspect. For example, the communication device 500 may comprise a mobile wireless and/or cellular telephone. Alternatively, the communication device 500 may comprise a fixed communication device, such as a Proxy Call/Session Control Function (P-CSCF) server, a network device, a server, a computer workstation, etc. It should be understood that communication device 500 is not limited to such a described or illustrated devices, but may further include a Personal Digital Assistant (PDA), a two-way text pager, a portable computer having a wired or wireless communication portal, and any type of computer platform having a wired and/or wireless communications portal. Further, the communication device 500 can be a remote-slave or other similar device, such as remote sensors, remote servers, diagnostic tools, data relays, and the like, which does not have an end-user thereof, but which simply communicates data across a wireless or wired network. In alternate aspects, the communication device 500 may be a wired communication device, such as a landline telephone, personal computer, set-top box or the like. Additionally, it should be noted that any combination of any number of communication devices 500 of a single type or a plurality of the afore-mentioned types may be utilized in a cellular communication system (not shown). Therefore, the present apparatus and methods can accordingly be performed on any form of wired or wireless device or computer module, including a wired or wireless communication portal, including without limitation, wireless modems, Personal Computer Memory Card International Association (PCMCIA) cards, access terminals, personal computers, telephones, or any combination or sub-combination thereof.

Additionally, the communication device 500 may include a user interface 502 for purposes such as viewing and interacting with advertisements. This user interface 502 includes an input device 504 operable to generate or receive a user input into the communication device 500, and an output device 506 operable to generate and/or present information for consumption by the user of the communication device 500. For example, input device 502 may include at least one device such as a keypad and/or keyboard, a mouse, a touch-screen display, a microphone in association with a voice recognition module, etc. Further, for example, output device 506 may include a display, an audio speaker, a haptic feedback mechanism, etc. Output device 506 may generate a graphical user interface, a sound, a feeling such as a vibration or a Braille text producing surface, etc.

Further, communication device 500 may include a computer platform 508 operable to execute applications to provide functionality to the device 500, and which may further interact with input device 504 and output device 506. Computer platform 508 may include a memory, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory may include active memory and storage memory, including an electronic file system and any secondary and/or tertiary storage device, such as magnetic media, optical media, tape, soft and/or hard disk, and removable memory components. In the illustrative version, memory is depicted as RAM memory 509 and a non-volatile local storage component 510, both connected to a data bus 512 of the computer platform 508.

Further, computer platform 508 may also include a processor 514, which may be an application-specific integrated circuit (ASIC), or other chipset, processor, logic circuit, or other data processing device. In some aspects, such as when communication device 500 comprises a cellular telephone, processor or other logic such as an application specific integration circuit (ASIC) 516 may execute an application programming interface (API) 518 that interfaces with any resident software components, depicted as applications (e.g., games) 520 that may be active in memory 509 for other functions (e.g., communication call control, alarm clock, text messaging, etc.). It should be appreciated with the benefit of the present disclosure that applications consistent with aspects of the present disclosure may omit other applications and/or omit the ability to receive streaming content such as voice call, data call, and media-related applications in memory 509. Device APIs 518 may run on top of a runtime environment executing on the respective communication device. One such API 518 runtime environment is Binary Runtime Environment for Wireless® (BREW®) API 522, developed by QUALCOMM Incorporated of San Diego, Calif.

Additionally, processor 514 may include various processing subsystems 524 embodied in hardware, firmware, software, and combinations thereof, that enable the functionality of communication device 500 and the operability of the communication system 300 (FIG. 5). For example, processing subsystems 524 allow for initiating and maintaining communications, and exchanging data, with other networked devices as well as within and/or among components of communication device 500. In one aspect, such as in a cellular telephone, processor 514 may include one or a combination of processing subsystems 524, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 524 of processor 514 may include any subsystem components that interact with applications executing on computer platform 508.

Computer platform 508 may further include a communications module 526 that enables communications among the various components of communication device 500, as well as being operable to provide communications related to receiving and tracking advertisements presented on and/or interacted with on the user interface 502. Communications module 526 may be embodied in hardware, firmware, software, and/or combinations thereof, and may further include all protocols for use in intra-device and inter-device communications. A GPS engine 528 or other location sensing components provide location information of the communication device 500.

Certain of these capabilities of the communication device 500 can be facilitated by code loaded from local storage 510, retained in memory 509, and executed by the processor 514, such as an operating system (OS) 530. A user interface (UI) module 532 facilitates interactive control with the user interface 502. The UI module 532 includes an advertising interaction component 534 that provides tailored interaction options for particular advertisements that are drawn from an advertisement cache 536 in an order specified by an advertisement queue 538 ordered by an advertising client 540, in particular an advertising packaging Triglet service adaptor 542. The usage of advertisements is captured by an advertising tracking component 544. A location reporting component 546 can include logic that selectively reports device location.

In one aspect, the UI module 532 can include a keyword monitor 547 that monitors all user inputs in order to capture keywords or data from which keywords can be inferred. Thereby, no matter what application or communication function is being utilized, this user behavior associated with keywords can be captured.

In one aspect, the BREW APIs 522 provide the ability for applications to call Device APIs 518 and other functions without having to be written specifically for the type of communication device 500. Thus, an application 520 or components for end-to-end mobile advertising on the communication device 500 may operate identically, or with slight modifications, on a number of different types of hardware configurations within the operating environment provided by BREW API 522, which abstracts certain hardware aspects. A BREW extension 548 adds additional capability to the programming platform of the BREW API 522, such as offering MP3 players, Java Virtual Machines, etc. As an example, the UI module 532 can be a BREW extension 548.

In order to distribute computational overhead and/or to reduce transmission overhead on the communication system 300 (FIG. 6), an artificial intelligence (AI) component 550 and/or a rule-based logic component 552 can infer user behavior for reporting, make decisions as to when a reportable advertising-related event has occurred, and/or extrapolate location based on intermittent location sensing, etc.

The rules-based logic component 552 can be employed to automate certain functions described or suggested herein. In accordance with this alternate aspect, an implementation scheme (e.g., rule) can be applied to define types of attributes that should be acted upon or ignored, correlate language elements to attributes, create rules that are aware of location sensing status, sensing a delay in last user interaction to determine if advertisement viewing is occurring, etc. By way of example, it will be appreciated that the rule-based implementation can automatically define criteria for types of user interactions that can be partially intruded upon by an advertisement. For example, during loading of a game, an advertisement can be allowed to be displayed full screen. When a half-screen application is running, example a text messaging application, then an advertisement banner can be displayed, which a user can selectively enable in order to receive subsidized service rates, for example. The rule-based logic component 552 could request impression advertising over click to action advertising in response to an inference made that the user does not directly interact with advertisement. In response thereto, the rule-based implementation can change the amount of notifications given, the level of detail provided, and/or prevent edits altogether that would result in a reset.

The AI component 550 can facilitate automating performance of one or more features described herein such as predicting user behavior, extrapolating intermittent location data, adjusting advertisement interaction options based on machine learning. Thus, employing various AI-based schemes can assist in carrying out various aspects thereof. For instance, the AI component 550 could be trained in a learning mode wherein the user's location is analyzed against a database of locations in order to create the behavioral profile. Then, certain patterns of user behavior can be classified.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs) to predict or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject disclosure can employ classifiers that are pre-trained (e.g., via a generic training data from multiple users) as well as methods of reinforcement learning (e.g., via observing user behavior, observing trends, receiving extrinsic information). Thus, the subject disclosure can be used to automatically learn and perform a number of functions, including but not limited to determining, according to a predetermined criteria, what constitutes a reset condition of concern, when/if to communicate impending controller reset, when/if to prevent a controller reset, preferences for types of data to exchange, etc.

Figure 8:
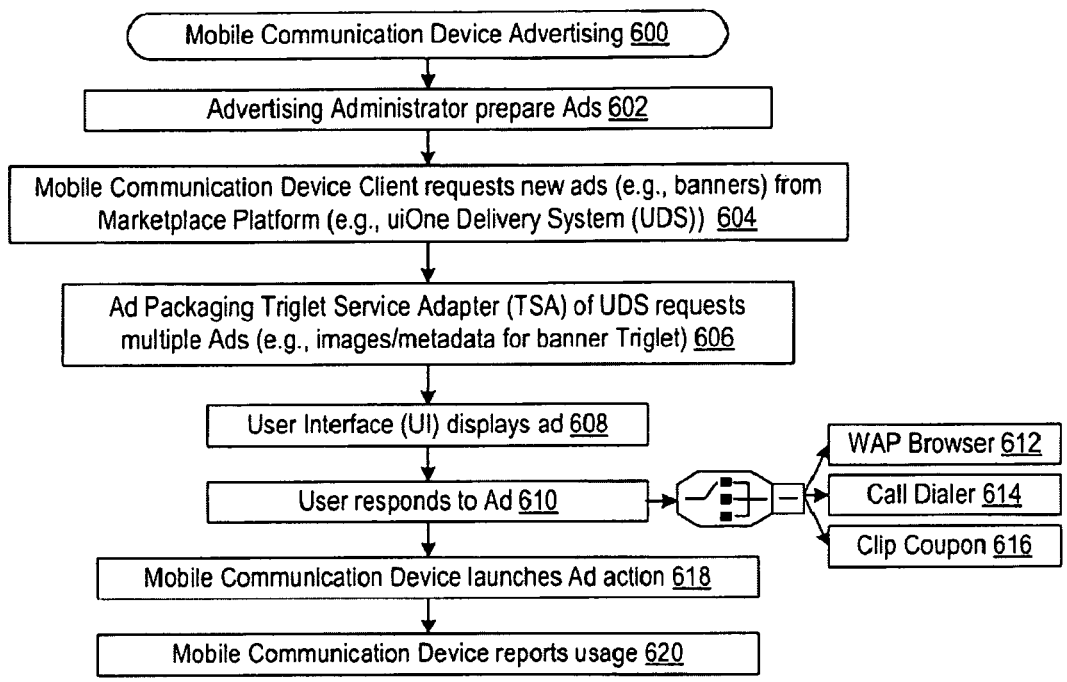
FIG. 8 is a flow diagram of a methodology for mobile communication device advertising performed by the communication system of FIG. 5, according to another aspect.

In FIG. 8, a methodology 600 for mobile communication device advertising largely performed by the communication system of FIG. 5 begins in block 602 with an advertising administrator preparing an advertisement for deployment on mobile communication devices, according to one aspect. A mobile communication device client requests new advertisements, such as banner advertisements, from the marketplace platform (e.g., uiOne Delivery System (UDS), in block 604. In block 606, the advertising packaging Triglet Service Adapter (TSA) of UDS requests multiple advertisements (e.g., images, metadata, etc.). In block 608, with the advertisements now received by the mobile communication device, the user interface displays a banner advertisement. In block 610, the advertisement provides one or more methods for a user to interact or respond to the advertisement. For instance, a wireless application protocol (WAP) browser can be activated by a "click to glance" operation in block 612. As another example, a "click to call" can be automatically invoked or a manually dialed called correlated to a telephone number displayed on the advertisement, depicted at 614 as "call dialer." As yet another example, the user interface can provide a coupon clipping function, depicted at block 616. In response to this interaction, the mobile communication device launches the advertisement action as requested in block 618. This interaction is then tracked for reporting advertisement usage in block 620.

Figure 9:
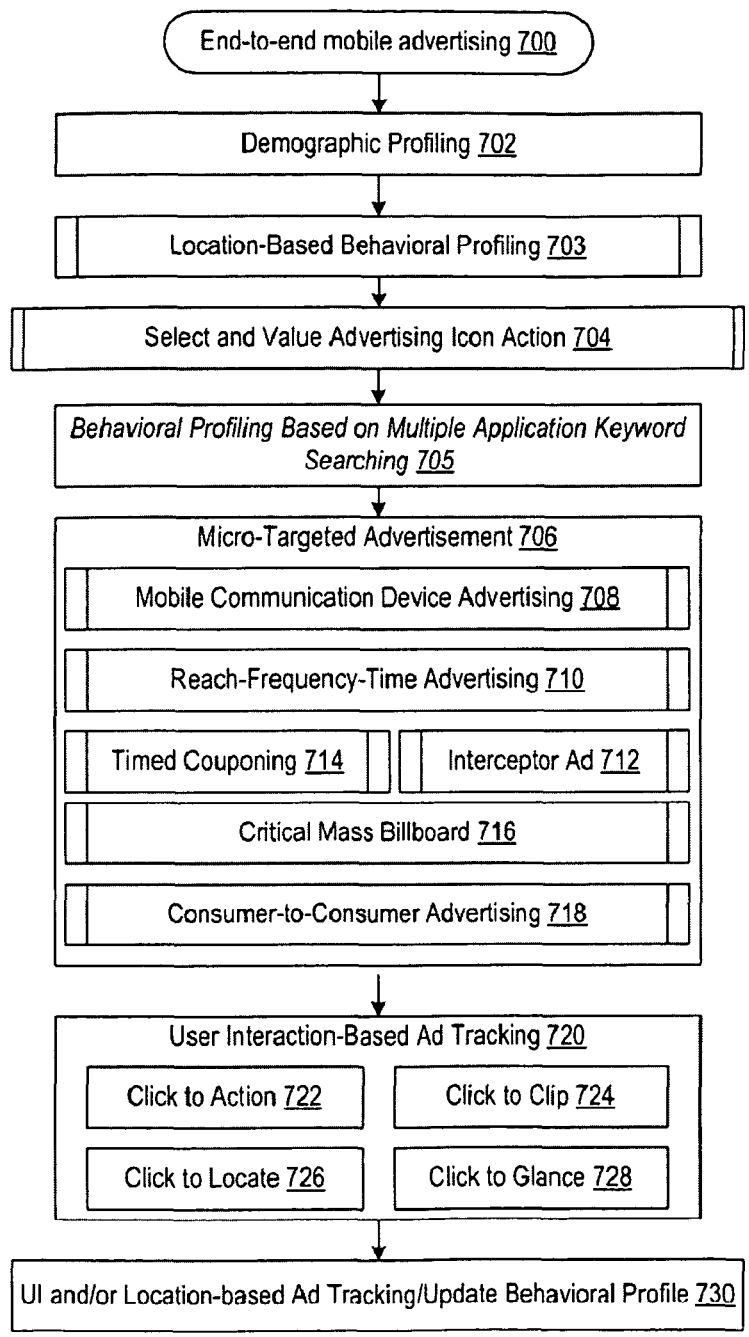
FIG. 9 is a flow diagram of a methodology for end-to-end mobile advertising, according to yet another aspect.

In FIG. 9, a methodology 700 for end-to-end mobile advertising includes features enabled by location sensing of the mobile communication devices. In block 702, demographic profiling is collected and maintained, although the weight given to such inputs can be limited, in accordance with one implementation. In block 703, location-based behavioral profiling is performed, based upon location reports from mobile communication devices that can infer behavioral preferences of a user of the device. This process is discussed below with regard to FIG. 10.

In block 704, a methodology for selecting and valuing advertising icon actions leverages the increased communication options can be available in the mobile communication device and/or with the advertiser, which is discussed in greater detail below with regard to FIG. 14.

In block 705, behavioral profiling of the user is enhanced by capturing keywords entered into a WAP browser and other interactions with the mobile communication device 308. In order to encompass a broader scope of interaction, a utility can monitor the user interface directly to capture keystrokes, perhaps correlated with what is being displayed. Alternatively or in addition, the keyword characterization can occur upstream in the communication system, especially for limited capability mobile communication devices 308.

Figure 11:
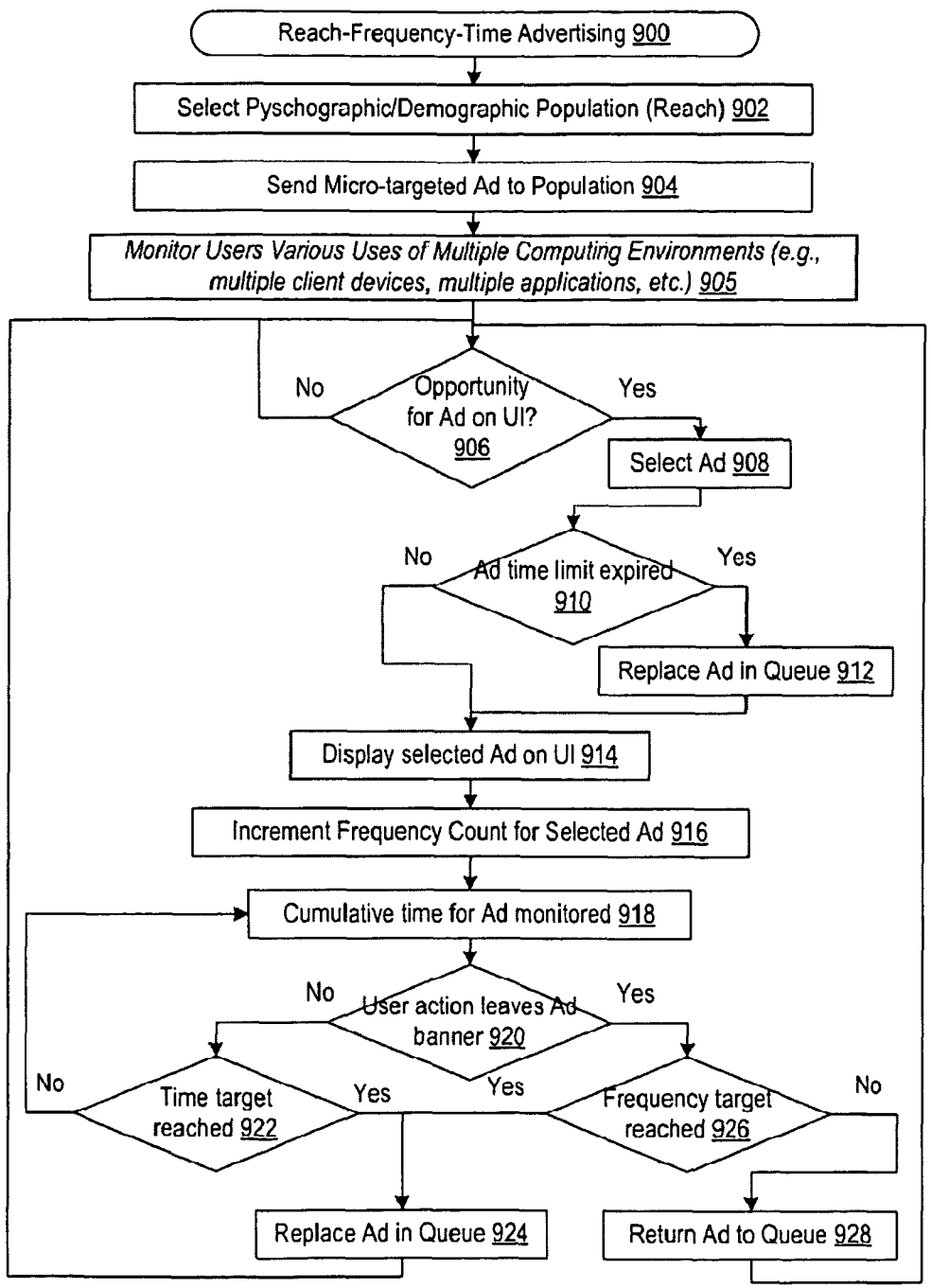
FIG. 11 is a flow diagram of a methodology for reach-frequency-time advertising of the methodology of FIG. 7, according to one aspect

In block 706, micro-targeted advertisement process is performed, as discussed above for FIG. 8, in support of location-disabled mobile communication devices. Another aspect is in block 710 discussed below with regard to FIG. 11, provides for reach-frequency-time advertising. An additional aspect is in block 712 that leverages the location and metric tagging capabilities to perform an interceptor advertisement campaign, discussed below with regard to FIG. 12. Yet a further aspect is in block 714 that leverages the metric tagging capabilities in order to provide timed couponing advertisements, discussed below with regard to FIG. 13.

Critical mass billboard advertising methodology (block 716) can be performed in instances in which location information for a mobile communication device are used in conjunction with a dynamic public advertising display, as discussed below with regard to FIG. 15. Also, a consumer-to-consumer advertising can be performed (block 718) for trusted entities that wish to perform user targeted advertising.

In block 720, advertising tracking can comprise in whole or in part tracking of user interaction with the advertisement. In one aspect, user interaction can comprise a click to action (block 722), which can cause a click to navigate to a web page of the advertiser. Click to action can also invoke a request to receive a call from the advertiser or to caller the advertiser. Click to action can also invoke SMS or other communication channels. In another aspect, user interaction can be click to clip (block 724) that allows a user to clip advertisements for later viewing. For example, clipping an advertisement in the middle of game play avoids disrupting the user experience. Promotional content can be saved for repeated viewing, such as viral videos that provide entertainment or informational value to the user while serving as impression or brand advertising for the advertiser. As a further aspect, the user interaction can be click to locate in block 726. For example, activating the advertisement can launch navigation information to the location of the advertiser. Click to locate can comprise being sensed as entering the location of the advertiser, which is deemed as a successful impression advertisement. Click to locate can comprise a user taking his advertisement display to the advertiser as an electronic discount coupon, which can be manually or automatically correlated with the advertisement for tracking of success. In yet another aspect, the user interaction can comprise click to glance (block 728), wherein an application is launched in another window of the user interface of the mobile communication device. In block 730, the user responses associated with the advertisement can be a source for tracking and updating user behavioral profile.

Figure 10:
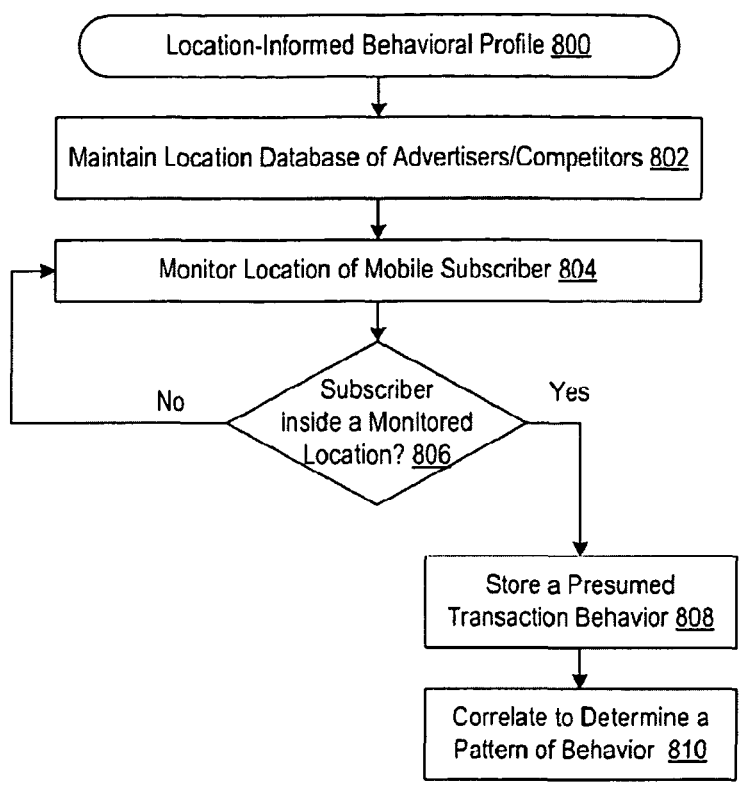
FIG. 10 is a flow diagram of a methodology for location-informed behavioral profiling of the methodology of FIG. 9, according to one aspect.

In FIG. 10, a methodology 800 for performing location-informed behavioral can comprise maintaining a location database of advertisers and competitors in block 802, in accordance with one implementation. Such location correlation can include prospective advertisers that can be approached about end-to-end mobile advertising. In block 804, locations of mobile subscribers are monitored. When a subscriber is determined to be in a monitored location in block 806, then a presumed transaction behavior is stored in block 808. A pattern can be correlated from one or more such presumed transaction behavior instances in order to enhance a behavioral profile of the user in block 810.

In FIG. 11, a methodology 900 for reach-frequency-time advertising begins in block 902 with forecasting a behavioral/demographic population of mobile communication devices that can benefit from a particular advertisement for goods or services, according to one aspect. A micro-targeted advertisement is sent to this forecasted population in block 904. In block 905, the various uses of the user interface (UI) are monitored, such as use of the calling screen, a text messaging screen, a webpage browsing screen, a game screen, personal organizer screen (e.g., calculator, calendar, contact list, notepad, etc.). Depending on the available screen size, etc., advertising space can be available, either during use or when loading and/or exiting a screen. At the device, an opportunity is recognized for presenting an advertisement on the user interface (UI) in block 906. For example, the device UI is activated as a user selects menu options, etc., such that the UI is active and viewing of the advertisement can be presumed.

In block 908, an advertisement is selected from those advertisements cached on the device. If the next advertisement queued for presentation is determined to have expired in block 910, then the next advertisement in the queue is selected in block 912. In block 914, with an unexpired advertisement accessed, the advertisement is presented (e.g., displayed) on the UI. The usage tracking for this advertisement is updated with an incremented frequency count in block 916 and cumulated duration of displayed is monitored in block 918. If a user has not caused an action that would leave the advertisement banner in block 920, then a further determination is made in block 922 as to whether a time target has been reached, either for this particular frequency count or a total duration of display on this mobile communication device. If not, processing returns to block 918. If the time limit is reached in block 922, the advertisement is replaced in the queue in 924 with the next advertisement and processing returns to block 906. If in block 920 the user has taken an action that warrants leaving the advertisement banner, then a further determination is made in block 926 as to whether a frequency count target has been reached. If not, the advertisement is returned or maintained in the queue to be repeated after a suitable interval in block 928 and processing returns to block 906. If the frequency count target has been reach in block 926, then the advertisement is replaced in the queue in block 924 and processing returns to block 906.

The frequency and duration can be prescribed to be associated with a certain use of the wireless device. An advertiser may want a game advertisement to only run on users who use their wireless device for gaming. As another example, use as a telephone can omit advertisements as the user is paying a carrier for this service. By contrast, a discounted or demonstration version of a game can be accepted along with advertisements that warrant the subsidized cost. However, in the illustrative aspect all uses of the user interface (UI) conducive to advertising can be used as opportunities to display advertisements. The calculation of frequency and duration counts each presentation. Thus, cross content advertising includes when an advertising campaign multiple types of wireless device uses. As an illustrative example, consider a wireless device user Joey, who is a 14-year-old male skateboard fan, as determined by his behavioral and demographic profiles. A sports shoe advertiser directs that subscribers should view a shoe ad four times for a total of 30 seconds on their handset. Joey views the shoe ad as part of playing a skateboarding game, and then goes on to the Financial News Network webpage to receive stock quotes, and receives the same ad campaign from the shoe advertise, which counts as the second viewing of the ad and part of the 30 second duration. Whatever content Joey views, including his uiOne Homescreen, Joey sees the shoe ad until the metrics are satisfied.

Figure 12:
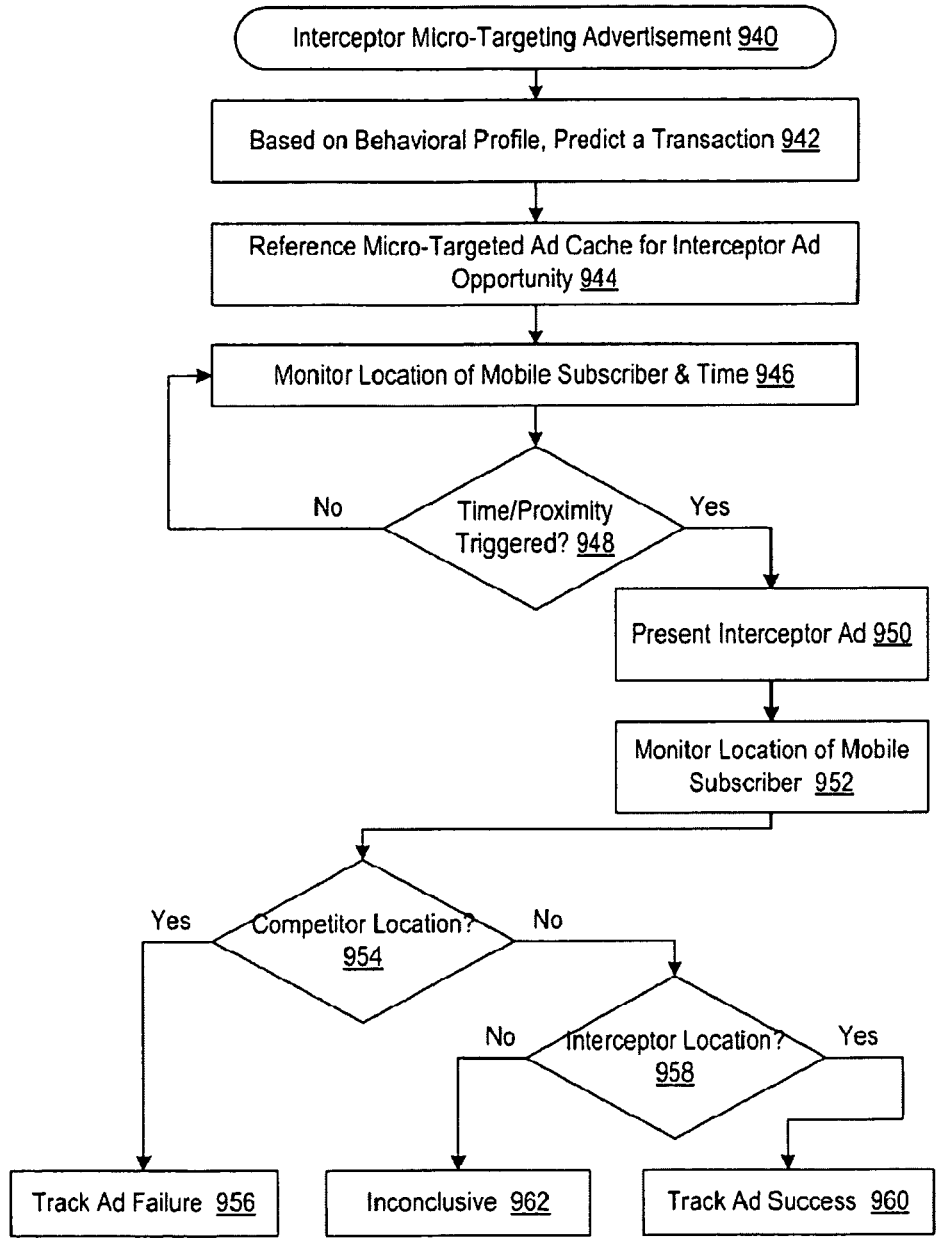
FIG. 12 is a flow diagram of a methodology for interceptor micro-targeting advertising of the methodology of FIG. 7, according to another aspect.

In FIG. 12, a methodology 940 for interceptor micro-targeting advertisement begins by utilizing a location-informed behavioral profile in order to predict a transaction in block 942, according to one aspect. An advertisement is requested or located in the advertisement cache as an interceptor advertisement opportunity when the predicted transaction is at a competitor business. The advertisement billing rate can be increased, for example, if the advertiser chooses to send advertisements to those going to competitors. Revenue optimizing advertising auctioning can thus increase the priority of such opportunities.

In some aspects, the advertiser chooses to target a specific window of opportunity when the user may be the most susceptible to changing behavior if presented with an advertisement. Thus, in block 946, the location of the mobile subscriber and the time/date are monitored in order to comply with the presentation criteria specified by the advertisement campaign. For example, a user may tend to go to a competitor restaurant for lunch on Fridays at noon. The advertiser may choose to present an advertisement to such users at 11:30 and/or when the user is within three minutes travel based on current average speed to the advertiser's business and/or when the user is within half a mile of the competitor's location. In block 948, a determination is made as to whether the time/proximity metrics have been triggered. If so, the interceptor advertisement is presented in block 950. Although not depicted, the user can interact with the advertisement in a way that could be deemed a success of the advertisement. In the instance of impression advertisement as depicted in block 952, the location of the mobile subscriber is monitored. If a competitor location is entered in block 954, then in block 956 the advertisement is tracked as having failed in this instance. If not a competitor location in block 954, then a determination is made as to whether the interceptor advertiser location has been entered in block 958. If so, then the advertisement can be tracked as having succeeded in block 960. If not the competitor or interceptor location within any reasonable period of time, then the advertisement can be tracked as having had an inconclusive effect in block 962.

Figure 13:
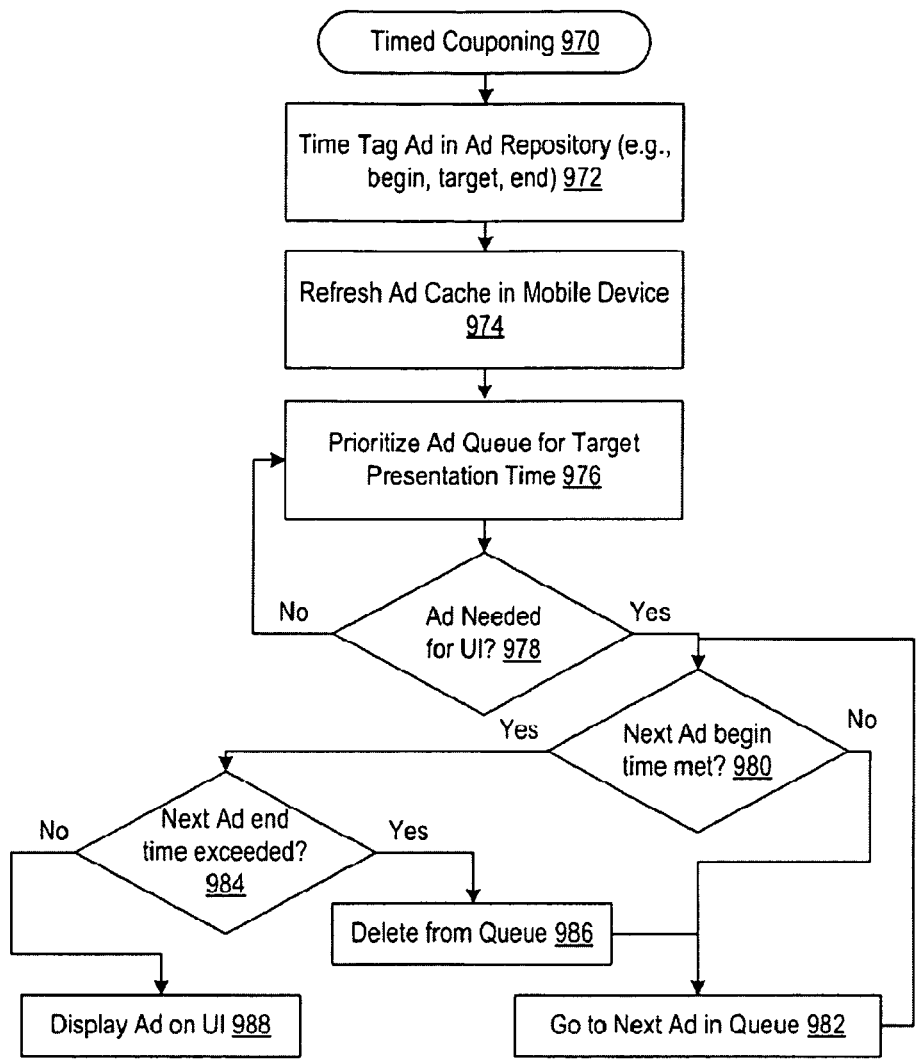
FIG. 13 is a flow diagram of a methodology for timed coupon advertising of the methodology of FIG. 9, according to still another aspect.

In FIG. 13, a methodology 970 for a time couponing on mobile communication devices takes advantage of time tagged metrics (e.g., begin time, target time, and/or end time) associated with advertisements in and advertising repository in block 972, according to one aspect. An advertisement cache in the mobile device is refreshed with timed coupon advertisements in block 974. The advertisement queue is optimized so that timed coupon advertisements are scheduled for presentation within the schedule metric in block 976. Then a determination is made in block 978 that an advertisement is needed for the user interface. If so, then a further determination is made in block 980 to confirm that any begin time metric has been met. If not, the next advertisement in the queue is selected and processing returns to block 980. If the begin time has been met in block 980, then a further determination is made in block 984 as to whether the end time has been exceeded. If so, the advertisement is deleted from the queue in block 986 and the next advertisement in the queue is selected in block 982. If the advertisement end time has not been exceeded in block 984, then the advertisement is displayed on the UI in block 988.

Figure 14:
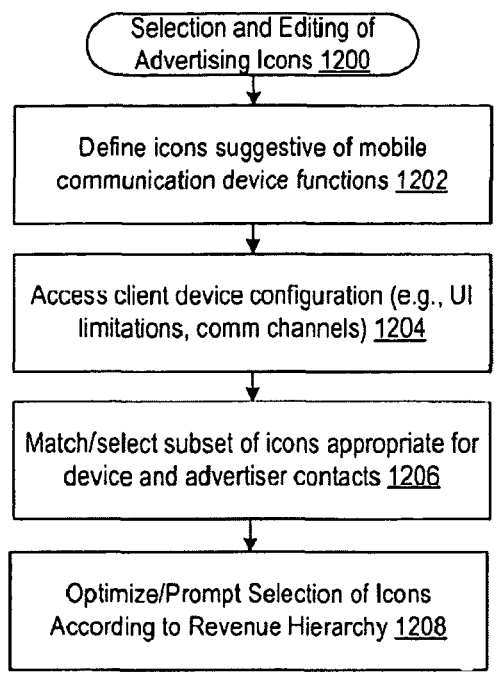
FIG. 14 is a flow diagram of a methodology for selecting icon actions for a mobile communication device, according to one aspect.

In FIG. 14, a methodology 1200 for selecting advertising icon actions suitable for a mobile communication device begins by defining an advertising icon suggestive and operable for all the possible actions which might include, but not limited to, click-to-call, click-to-brochure, click-to-clip, click-to-message, click-to-locate, click-to-WAP, click-to-email, click-to-forward, click-to-promotion, click-to-coupon, click-to-buy, and click-to-landing (block 1202), according to one aspect. The client device configuration is accessed to determine limitations on types of workflows (e.g., communication channels) available, limitations on input and output of the user interface, etc. (block 1204). A subset of advertising actions and icons is presented that are appropriate for the type of device. The list can also indicate which advertising icons have been supplied sufficient information regarding the advertiser to activate (e.g., email address, telephone number, website, uniform resource locator (URL) for brochure, etc.) (block 1206). In particular, in an illustrative implementation the list contains a set of actions, each action contains an icon or an icon reference and a workflow command and parameters (e.g., a BREW URI on a BREW platform). A selection process, either automatic or with user prompts, can guide placement and configuration of advertising action icons for inclusion. Selection can be influenced by the relative value to the advertiser of the different types of activation, incorporating a hierarchy for suggestion or rendering (block 1208).

Figure 15:
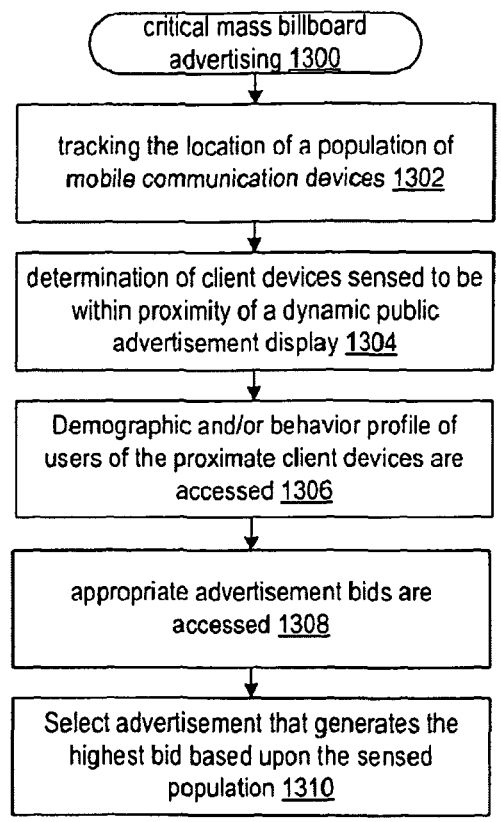
FIG. 15 is a flow diagram of a selecting a publicly viewed advertisement based upon sensed demographics of a viewing audience, according to one aspect.

In FIG. 15, a methodology 1300 for critical mass billboard advertising includes tracking the location of a population of mobile communication devices (block 1302), in accordance to one implementation. A determination is made of client devices sensed to be within proximity of a dynamic public advertisement display (block 1304). Demographic and/or behavior profile of users of the proximate client devices are accessed in order to select appropriate advertisements (block 1306). Based on this population data, appropriate advertisement bids are accessed (block 1308). Revenues are optimized by selecting an advertisement that generates the highest bid based upon the sensed population (block 1310).

Figure 16:
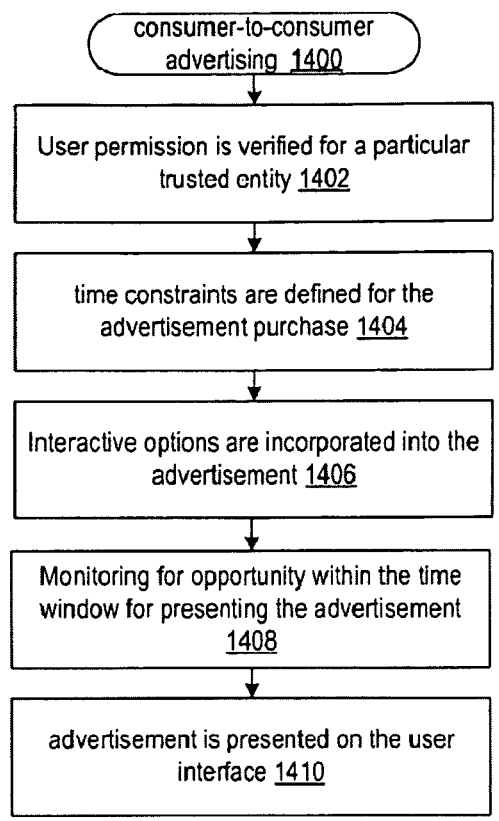
FIG. 16 is a flow diagram for consumer to consumer advertising, according to one aspect.

In FIG. 16, a methodology 1400 for consumer-to-consumer advertising leverages the advertising distribution capabilities of the marketplace platform. User permission is verified for a particular trusted entity (e.g., individual, fraternal association) (block 1402), according to one implementation. The time constraints are defined for the advertisement purchase (e.g., holiday, birthday, proximity to a meeting event, etc.) (block 1404). Interactive options are incorporated into the advertisement (block 1406). User behavior is monitored for an opportunity within the time window for presenting the advertisement (block 1408). The advertisement is presented on the user interface of the mobile communication device (block 1410).

Figure 17:
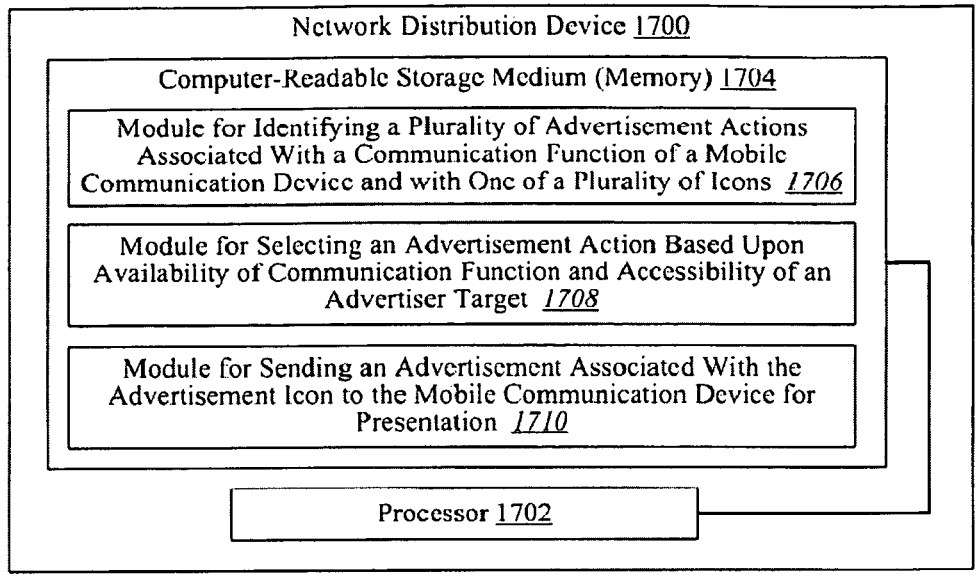
FIG. 17 is a block diagram of a network distribution device having modules in computer-readable storage medium executed by at least one processor for distributing advertisement content to a mobile communication device, according to one aspect.

In FIG. 17, an exemplary network distribution device 1700 has at least one processor 1702 for executing modules in computer-readable storage medium (memory) 1704 for distributing advertisement content to a mobile communication device. The network distribution device 1700 can comprise the marketplace platform 12, 106, 302 (FIGS. 1-5) or perform a portion of functions thereof. In the illustrative modules depicted, a first module 1706 provides means for identifying a plurality of advertisement actions, each action associated with a communication function of a mobile communication device and each action associated respectively with one of a plurality of icons. A second module 1708 provides means for selecting an advertisement action from the plurality of advertisement actions based upon availability of the associated communication function for the mobile communication device and accessibility of an advertiser target by the associated communication function. A third module 1710 provides means for sending an advertisement associated with the advertisement icon to the mobile communication device for presentation.

Figure 18:
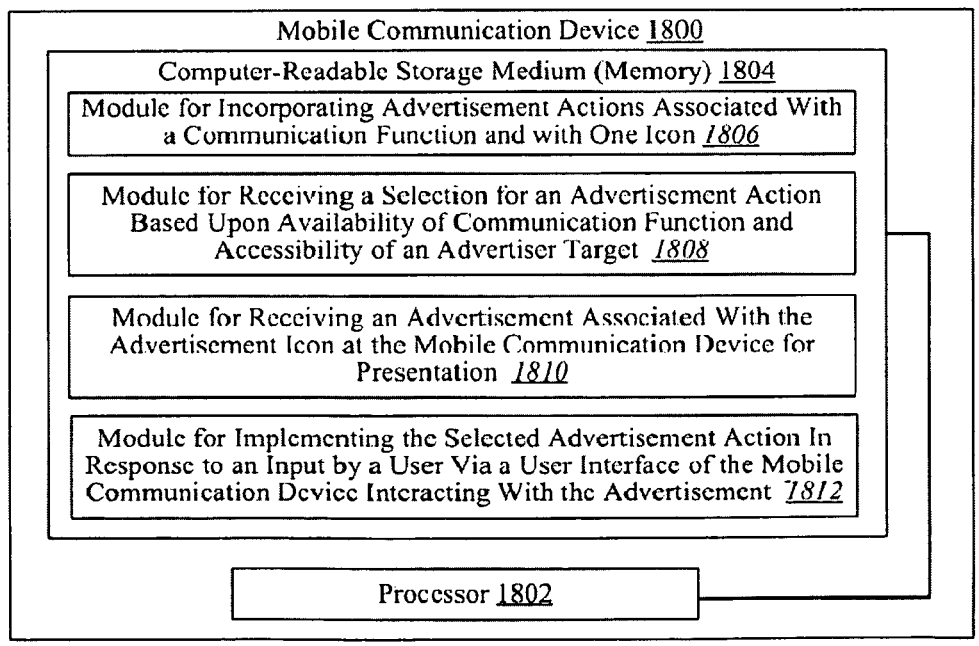
FIG. 18 is a block diagram of a mobile communication device having modules in computer-readable storage medium executed by at least one processor for implementing advertisement, according to one aspect.

In FIG. 18, an exemplary mobile communication device 1800 has at least one processor 1802 for executing modules in a computer-readable storage medium (memory) 1804 for presenting advertisement. In the illustrative modules depicted, a first module 1806 provides means for incorporating a plurality of advertisement actions, each action associated with a communication function of a mobile communication device and each action associated respectively with one of a plurality of icons. A second module 1808 provides means for receiving a selection for an advertisement action from the plurality of advertisement actions based upon availability of the associated communication function for the mobile communication device and accessibility of an advertiser target by the associated communication function. A third module 1810 provides means for receiving an advertisement associated with the advertisement icon at the mobile communication device for presentation. A fourth module 1812 provides means for implementing the selected advertisement action in response to an input by a user via a user interface of the mobile communication device interacting with the advertisement.

It should be appreciated that aspects described herein segregate certain functions for network-level storage and processing and other functions for performance by a mobile communication device. It should be appreciated with the benefit of the present disclosure that applications consistent with aspects can include configurations with more distributed processing to reduce computational overhead at a centralized location and/or reduce communication loads. Alternatively, some limited capability mobile devices can be served with mobile advertising with additional processing centralized.

The various illustrative logics, logical blocks, modules, and circuits described in connection with the versions disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method for distributing advertisement content to a mobile communication device, comprising:
    identifying a plurality of advertisement actions, each action associated with a different communication function of the mobile communication device and each action associated respectively with one of a plurality of icons such that each action is configured to be triggered in association with a communication function-specific royalty responsive to a selection of the associated icon at the mobile communication device;
    selecting an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action; and
    sending an advertisement along with the icon associated with the selected advertisement action to the mobile communication device for presentation.

2. The method of claim 1, further comprising:
    predicting the communication function-specific royalty for each communication function based on a value set for each communication function; and
    determining a subset of communication functions that are available at the mobile communication device,
    wherein the selecting selects the advertisement action from the determined subset that is associated with a highest predicted communication function-specific royalty.

3. The method of claim 1, further comprising receiving tracked results of presentation of the advertisement from the mobile communication device.

4. The method of claim 1, further comprising facilitating the communication function associated with the selected advertisement action to communicate with the advertiser target in response to a user selection of the icon of the advertisement.

5. The method of claim 4, further comprising receiving tracked results of user interaction with the icon of the advertisement.

6. The method of claim 4, wherein facilitating the communication function associated with the selected advertisement action further comprises click to call.

7. The method of claim 4, wherein facilitating the communication function associated with the selected advertisement action further comprises click to wireless access protocol browser.

8. The method of claim 4, wherein facilitating the communication function associated with the selected advertisement action further comprises click to brochure.

9. The method of claim 4, wherein facilitating the communication function associated with the selected advertisement action further comprises click to email.

10. The method of claim 4, wherein facilitating the communication function associated with the selected advertisement action further comprises click to landing.

11. The method of claim 4, wherein facilitating the communication function associated with the selected advertisement action further comprises click to clip.

12. The method of claim 4, wherein facilitating the communication function associated with the selected advertisement action further comprises click to forward.

13. The method of claim 4, wherein facilitating the communication function associated with the selected advertisement action further comprises click to content.

14. The method of claim 4, wherein facilitating the communication function associated with the selected advertisement action further comprises click to message.

15. The method of claim 4, wherein facilitating the communication function associated with the selected advertisement action further comprises click to locate.

16. The method of claim 4, wherein facilitating communication function associated with the selected advertisement action further comprises click to promotion.

17. The method of claim 4, wherein facilitating the communication function associated with the selected advertisement action further comprises click to coupon.

18. The method of claim 4, wherein facilitating the communication function associated with the selected advertisement action further comprises click to buy.

19. At least one processor for distributing advertisement content to a mobile communication device, comprising:
a module for identifying a plurality of advertisement actions, each action associated with a different communication function of the mobile communication device and each action associated respectively with one of a plurality of icons such that each action is configured to be triggered in association with a communication function-specific royalty responsive to a selection of the associated icon at the mobile communication device;
a module for selecting an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action; and
a module for sending an advertisement along with the icon associated with the selected advertisement action to the mobile communication device for presentation.

20. A computer program product for distributing advertisement content to a mobile communication device, comprising:
a non-transitory computer-readable medium comprising,
at least one instruction for causing a computer to identify a plurality of advertisement actions, each action associated with a different communication function of the mobile communication device and each action associated respectively with one of a plurality of icons such that each action is configured to be triggered in association with a communication function-specific royalty responsive to a selection of the associated icon at the mobile communication device;
at least one instruction for causing a computer to select an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action ; and
at least one instruction for causing a computer to send an advertisement along with the icon associated with the selected advertisement action to the mobile communication device for presentation.

21. An apparatus for distributing advertisement content to a mobile communication device, comprising:
means for identifying a plurality of advertisement actions, each action associated with a different communication function of the mobile communication device and each action associated respectively with one of a plurality of icons such that each action is configured to be triggered in association with a communication function-specific royalty responsive to a selection of the associated icon at the mobile communication device;
means for selecting an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action; and
means for sending an advertisement along with the icon associated with the selected advertisement action to the mobile communication device for presentation.

22. An apparatus for distributing advertisement content to a mobile communication device, comprising:
an editing computing platform comprising a graphical user interface for identifying a plurality of advertisement actions, each action associated with a different communication function of the mobile communication device and each action associated respectively with one of a plurality of icons such that each action is configured to be triggered in association with a communication function-specific royalty responsive to a selection of the associated icon at the mobile communication device, and for selecting an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action; and
a communication module for sending an advertisement along with the icon associated with the selected advertisement action to the mobile communication device for presentation.

23. The apparatus of claim 22, further comprising a processor of a marketing computing platform for predicting the communication function-specific royalty for each communication function based on a value set for each communication function, for determining a subset of communication functions that are available at the mobile communication device, wherein the selecting selects the advertisement action from the determined subset that is associated with a highest predicted communication function-specific royalty.

24. The apparatus of claim 22, further comprising the processor for receiving tracked results of presentation of the advertisement from the mobile communication device.

25. The apparatus of claim 24, further comprising the processor for facilitating the communication function associated with the selected advertisement action to communicate with the advertiser target in response to a user selection of the icon of the advertisement.

26. The apparatus of claim 25, further comprising the processor for receiving tracked results of user interaction with the icon of the advertisement.

27. The apparatus of claim 25, wherein the processor for facilitating the communication function associated with the selected advertisement action further comprises click to call.

28. The apparatus of claim 25, wherein the processor for facilitating the communication function associated with the selected advertisement action further comprises click to wireless access protocol browser.

29. The apparatus of claim 25, wherein the processor for facilitating the communication function associated with the selected advertisement action further comprises click to brochure.

30. The apparatus of claim 25, wherein the processor for facilitating the communication function associated with the selected advertisement action further comprises click to email.

31. The apparatus of claim 25, wherein the processor for facilitating the communication function associated with the selected advertisement action further comprises click to landing.

32. The apparatus of claim 25, wherein the processor for facilitating the communication function associated with the selected advertisement action further comprises click to clip.

33. The apparatus of claim 25, wherein the processor for facilitating the communication function associated with the selected advertisement action further comprises click to forward.

34. The apparatus of claim 25, wherein the processor for facilitating the communication function associated with the selected advertisement action further comprises click to content.

35. The apparatus of claim 25, wherein the processor for facilitating the communication function associated with the selected advertisement action further comprises click to message.

36. The apparatus of claim 25, wherein the processor for facilitating the communication function associated with the selected advertisement action further comprises click to locate.

37. The apparatus of claim 25, wherein the processor for facilitating the communication function associated with the selected advertisement action further comprises click to promotion.

38. The apparatus of claim 25, wherein the processor for facilitating the communication function associated with the selected advertisement action further comprises click to coupon.

39. The apparatus of claim 25, wherein the processor for facilitating the communication function associated with the selected advertisement action further comprises click to buy.

40. A method for a mobile communication device to implement advertisement content, comprising:
   incorporating a plurality of advertisement actions, each action associated with a different communication function of a mobile communication device and a communication function-specific royalty, and each action associated respectively with one of a plurality of icons;
   receiving a selection for an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action;
   receiving an advertisement associated with an advertisement icon at the mobile communication device for presentation; and
   implementing the selected advertisement action in response to an input by a user via a user interface of the mobile communication device interacting with the advertisement.

41. The method of claim 40, further comprising:
   predicting the communication function-specific royalty for each communication function based on a value set for each communication function; and
   determining a subset of communication functions that are available at the mobile communication device,
   wherein the selecting selects the advertisement action from the determined subset that is associated with a highest predicted communication function-specific royalty.

42. The method of claim 40, further comprising tracking results of presentation of the advertisement to the user.

43. The method of claim 40, further comprising implementing the communication function associated with the selected advertisement action by initiating communication with the advertiser target in response to a user selection of the advertisement icon of the advertisement.

44. The method of claim 40, further comprising tracking results of user interaction with the advertisement icon of the advertisement.

45. The method of claim 40, wherein implementing the communication function associated with the selected advertisement action further comprises click to call.

46. The method of claim 40, wherein implementing the communication function associated with the selected advertisement action further comprises click to wireless access protocol browser.

47. The method of claim 40, wherein implementing the communication function associated with the selected advertisement action further comprises click to brochure.

48. The method of claim 40, wherein implementing the communication function associated with the selected advertisement action further comprises click to email.

49. The method of claim 40, wherein implementing the communication function associated with the selected advertisement action further comprises click to landing.

50. The method of claim 40, wherein implementing the communication function associated with the selected advertisement action further comprises click to clip.

51. The method of claim 40, wherein implementing the communication function associated with the selected advertisement action further comprises click to forward.

52. The method of claim 40, wherein implementing the communication function associated with the selected advertisement action further comprises click to content.

53. The method of claim 40, wherein implementing the communication function associated with the selected advertisement action further comprises click to message.

54. The method of claim 40, wherein implementing the communication function associated with the selected advertisement action further comprises click to locate.

55. The method of claim 40, wherein implementing the communication function associated with the selected advertisement action further comprises click to promotion.

56. The method of claim 40, wherein implementing the communication function associated with the selected advertisement action further comprises click to coupon.

57. The method of claim 40, wherein implementing the communication function associated with the selected advertisement action further comprises click to buy.

58. At least one processor for a mobile communication device to implement advertisement content, comprising:
   a module for incorporating a plurality of advertisement actions, each action associated with a different communication function of a mobile communication device and a communication function-specific royalty, and each action associated respectively with one of a plurality of icons;
   a module for receiving a selection for an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action ;

a module for receiving an advertisement associated with an advertisement icon at the mobile communication device for presentation; and a module for implementing the selected advertisement action in response to an input by a user via a user interface of the mobile communication device interacting with the advertisement.

59. A computer program product for a mobile communication device to implement advertisement content, comprising:

a non-transitory computer-readable medium comprising, at least one instruction for causing a computer to incorporate a plurality of advertisement actions, each action associated with a different communication function of a mobile communication device and a communication function-specific royalty, and each action associated respectively with one of a plurality of icons;

at least one instruction for causing the computer to receive a selection for an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action;

at least one instruction for causing the computer to receive an advertisement associated with an advertisement icon at the mobile communication device for presentation; and at least one instruction for causing the computer to implement the selected advertisement action in response to an input by a user via a user interface of the mobile communication device interacting with the advertisement.

60. An apparatus for a mobile communication device to implement advertisement content, comprising:

means for incorporating a plurality of advertisement actions, each action associated with a different communication function of a mobile communication device and a communication function-specific royalty, and each action associated respectively with one of a plurality of icons;

means for receiving a selection for an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action;

means for receiving an advertisement associated with an advertisement icon at the mobile communication device for presentation; and means for implementing the selected advertisement action in response to an input by a user via a user interface of the mobile communication device interacting with the advertisement.

61. An apparatus for a mobile communication device to implement advertisement content, comprising:

local storage for incorporating a plurality of advertisement actions, each action associated with a different communication function of a mobile communication device and a communication function-specific royalty, and each action associated respectively with one of a plurality of icons, and for receiving a selection for an advertisement action from the plurality of advertisement actions based upon availability of the communication function associated with the selected advertisement action for the mobile communication device, accessibility of an advertiser target by the communication function associated with the selected advertisement action and the communication function-specific royalty for the communication function associated with the selected advertisement action;

a communication module for receiving an advertisement associated with an advertisement icon at the mobile communication device for presentation; and a user interface for receiving an input by a user interacting with the advertisement; and a processor for implementing the selected advertisement action in response to the user input.

62. The apparatus of claim 61, further comprising the processor for predicting the communication function-specific royalty for each communication function based on a value set for each communication function, for determining a subset of communication functions that are available at the mobile communication device, wherein the advertisement action is selected from the determined subset that is associated with a highest predicted communication function-specific royalty.

63. The apparatus of claim 61, further comprising the processor tracking results of presentation of the advertisement to the user.

64. The apparatus of claim 61, further comprising the processor for implementing the communication function associated with the selected advertisement action by initiating communication with the advertiser target in response to a user selection of the advertisement icon of the advertisement.

65. The apparatus of claim 61, further comprising the processor tracking results of user interaction with the advertisement icon of the advertisement.

66. The apparatus of claim 61, wherein the processor implementing the communication function associated with the selected advertisement action further comprises click to call.

67. The apparatus of claim 61, wherein the processor for implementing the communication function associated with the selected advertisement action further comprises click to wireless access protocol browser.

68. The apparatus of claim 61, wherein the processor for implementing the communication function associated with the selected advertisement action further comprises click to brochure.

69. The apparatus of claim 61, wherein the processor for implementing the communication function associated with the selected advertisement action further comprises click to email.

70. The apparatus of claim 61, wherein the processor for implementing the communication function associated with the selected advertisement action further comprises click to landing.

71. The apparatus of claim 61, wherein the processor for implementing the communication function associated with the selected advertisement action further comprises click to clip.

72. The apparatus of claim 61, wherein the processor for implementing the communication function associated with the selected advertisement action further comprises click to forward.

73. The apparatus of claim 61, wherein the processor for implementing the communication function associated with the selected advertisement action further comprises click to content.

74. The apparatus of claim 61, wherein the processor for implementing the communication function associated with the selected advertisement action further comprises click to message.

75. The apparatus of claim 61, wherein the processor for implementing the communication function associated with the selected advertisement action further comprises click to locate.

76. The apparatus of claim 61, wherein the processor for implementing the communication function associated with the selected advertisement action further comprises click to promotion.

77. The apparatus of claim 61, wherein the processor for implementing the communication function associated with the selected advertisement action further comprises click to coupon.

78. The apparatus of claim 61, wherein the processor for implementing the communication function associated with the selected advertisement action further comprises click to buy.

* * * * *